INVENTORS
DAG V. L. LINDSTROM
AXEL G.G. CRONSTEN
BY Strauch, Nolan & Diggins
ATTORNEYS INVENTORS
DAG V.L. LINDSTROM
AXEL G.G. CRONSTEN
BY Strauch, Nolan & Diggins
ATTORNEYS Feb. 10, 1959 D. V. L. LINDSTRÖM ET AL 2,873,321

DEVICE FOR INDICATION OF A CERTAIN COMMUNICATION PATH AND/OR ITS ELECTRICAL CHARACTERISTICS

Filed March 9, 1954 20 Sheets-Sheet 3

INVENTORS
DAG V. L. LINDSTROM
AXEL G.G. CRONSTEN

BY Strauch, Nolan & Diggins

ATTORNEYS

Feb. 10, 1959 D. V. L. LINDSTRÖM ET AL 2,873,321

DEVICE FOR INDICATION OF A CERTAIN COMMUNICATION PATH AND/OR ITS ELECTRICAL CHARACTERISTICS

Filed March 9, 1954 20 Sheets-Sheet 4

INVENTORS
DAG V.L. LINDSTROM
AXEL G.G. CRONSTEN
BY Strauch, Nolan & Diggins
ATTORNEYS INVENTORS
DAG V.L. LINDSTROM
AXEL G.G. CRONSTEN
BY Strauch, Nolan & Diggins
ATTORNEYS INVENTORS
DAG V.L. LINDSTROM
AXEL G.G. CRONSTEN
BY Strauch, Nolan & Diggins
ATTORNEYS INVENTORS
DAG V.L. LINDSTROM
AXEL G.G. CRONSTEN
BY Strauch, Nolan & Diggins
ATTORNEYS INVENTORS
DAG V. L. LINDSTROM
AXEL G. G. CRONSTEN
BY Strauch, Nolan & Diggins
ATTORNEYS Feb. 10, 1959 D. V. L. LINDSTRÖM ET AL 2,873,321

DEVICE FOR INDICATION OF A CERTAIN COMMUNICATION PATH AND/OR ITS ELECTRICAL CHARACTERISTICS

Filed March 9, 1954 20 Sheets-Sheet 9

INVENTORS
DAG V.L. LINDSTROM
AXEL G.G. CRONSTEN

BY Strauch, Nolan & Diggins

ATTORNEYS

INVENTORS
DAG V.L. LINDSTROM
AXEL G.G. GRONSTEN
BY Strauch, Nolan & Diggins
ATTORNEYS INVENTORS
DAG V.L. LINDSTROM
AXEL G.G. CRONSTEN
BY Stauch, Nolan & Diggins
ATTORNEYS Feb. 10, 1959 D. V. L. LINDSTRÖM ET AL 2,873,321

DEVICE FOR INDICATION OF A CERTAIN COMMUNICATION PATH AND/OR ITS ELECTRICAL CHARACTERISTICS

Filed March 9, 1954 20 Sheets-Sheet 12

INVENTORS
DAG V.L. LINDSTROM
AXEL G.G. CRONSTEN

BY Stevens, Nolan & Diggins

ATTORNEYS

Feb. 10, 1959 D. V. L. LINDSTRÖM ET AL 2,873,321

DEVICE FOR INDICATION OF A CERTAIN COMMUNICATION PATH AND/OR ITS ELECTRICAL CHARACTERISTICS

Filed March 9, 1954 20 Sheets-Sheet 13

INVENTORS
DAG V.L. LINDSTROM
AXEL G.G. CRONSTEN

BY Strauch, Nolan & Diggins

ATTORNEYS

INVENTORS
DAG V.L. LINDSTROM
AXEL G.G. CRONSTEN
BY Strauch, Nolan & Diggins
ATTORNEYS Feb. 10, 1959 D. V. L. LINDSTRÖM ET AL 2,873,321

DEVICE FOR INDICATION OF A CERTAIN COMMUNICATION PATH AND/OR ITS ELECTRICAL CHARACTERISTICS

Filed March 9, 1954 20 Sheets-Sheet 15

INVENTORS
DAG V.L. LINDSTROM
AXEL G.G. CRONSTEN

BY Strauch, Nolan & Diggins

ATTORNEYS

INVENTORS
DAG V. L. LINDSTROM
AXEL G.G. CRONSTON
BY Strauch, Nolan & Diggins
ATTORNEYS INVENTORS
DAG V. L. LINDSTROM
AXEL G. G. CRONSTEN
BY Strauch, Nolan & Diggins
ATTORNEYS INVENTORS
DAG V.L. LINDSTROM
AXEL G.G. CRONSTEN
BY Stranch, Nolan & Diggins
ATTORNEYS INVENTORS
DAG V.L. LINDSTROM
AXEL G.G. CRONSTON
BY Strauch, Nolan & Diggins
ATTORNEYS INVENTORS
DAG V.L. LINDSTROM
AXEL G.G. CRONSTEN
BY Strauch, Nolan & Diggins
ATTORNEYS United States Patent Office 2,873,321
Patented Feb. 10, 1959

2,873,321

DEVICE FOR INDICATION OF A CERTAIN COMMUNICATION PATH AND/OR ITS ELECTRICAL CHARACTERISTICS

Dag V. L. Lindström, Bromma, and Axel G. G. Cronsten, Lidingo, Sweden

Application March 9, 1954, Serial No. 415,092

Claims priority, application Sweden March 12, 1953

29 Claims. (Cl. 179—175.2)

The present invention relates to an arrangement for tracing connections in switching networks comprising several switching stages for selectively establishing connections through a series of such stages.

Devices of this type are particularly useful in automatic telephone and telegraph systems, and this applies especially to areas which have been wholly converted to automatic switching.

The tracing of a selected communication path is of particular interest when faults occur in the above type of systems. If so, the invention can be used to trace what path the communication has passed along and to locate where it has been interrupted. In telephone systems, when a calling subscriber fails to obtain his desired connection to a called subscriber, this invention makes it possible to determine over what exchanges the call has been connected and within what exchange it has been interrupted, so that fault location can start at the last-mentioned exchange. There exist already devices, particularly in so-called marker systems, by means of which the positions of such interrupted lines within a certain exchange can be indicated. This indication can be obtained according to the punched-card principle, or by means of a centralograph. Such devices are of a highly complex nature, however, and they can be used to advantage only in telephone systems of the by-pass type. Besides they have not been used for determining the location of a connection that has been interrupted within a particular exchange when the connection has had to pass through a number of exchanges.

It is an object of this invention to provide an arrangement which does not have the foregoing disadvantages. This invention is based on the principle that a tone is transmitted over the communication path the connection of which has been intrerupted. This tone produces an electric and/or magnetic field round its path which is subsequently traced by means of a "tone-locating" procedure. A somewhat similar principle has already been applied in so-called cable-fault locators (see Tekniska Meddelanden fran Kungl. Telegrafstyrelsen 1945, pp. 67–71). For this kind of application an alternating current is transmitted over a certain conductor in a cable and, by the aid of a locating device which is sensitive to the electric and/or magnetic field, it is then possible to locate manually the place where a change, if any, has occurred in the electric characteristics of the conductor, or to determine the position of the conductor within a bunch of cable conductors.

The present invention which makes use of the above locating principle is mainly characterized by a tone being transmitted over the conductors of the connection to be located, for example, a subscriber's line over which the subscriber has failed to obtain a desired connection. A capacitive and/or magnetic coupling is then associated with all or part at least of the possible, paths of this connection could take and connected to an indicating device which indicates the presence of the above-mentioned alternating current. This capacitive and/or inductive coupling is balanced in such a way that the coupling from one connection to another within the respective line does not give rise to disturbing crosstalk, but at the same time, the coupling obtained is so powerful that the transmitted amount of energy is not so small as to allow disturbances to distort the indication data.

The invention therefore is useful for indentifying in which of a plurality of communication paths, each including one or several connections, possibly provided with amplifiers, a certain connection occurs. The invention is substantially characterized by the fact that a voltage from a special power supply, as for example an alternating current supply, is arranged to be connected to a suitable point on "the line connection in question." "The line connection in question" here refers to the devices, which also may include wireless connections, which are required to transfer information between the end points of the switching network connection. Further, couplings of inductive, capactive or resistive nature, or couplings by means of direct contact to the switching stages through which the line connection in question may extend, are arranged at coupling points at a number of places in the various stages, irrespective of whether the switching stages are at one or at several exchanges. Connections lead from the coupling points to an indicating device, which may be equipped with amplifiers. Through selecting devices these indicating instruments are arranged to be successively connected to the above-mentioned coupling points in order to indicate where the special voltage occurs and thus also which devices and/or switching stages form the selected connection through the switching network.

According to one embodiment of the invention control connections are established between the different telephone exchanges, over which controlling connections for the above-mentioned selecting devices can be started, whereby the above-mentioned indicating devices in combination with the selecting devices are able to indicate which way a connection has passed. Further the selecting devices are preferably performed as crossbar switches, arranged for tracing by groups, whereby each contact spring in the crossbar switch is coupled to one of the above-mentioned coupling points. The above-mentioned coupling may be obtained by means of capacitances formed between the contact springs of the crossbar switch and separate metal strips, which are insulated from each other in such a way that a capacitance of about 20 pF is obtained between each contact spring and the adjacent metal strip. Further the tracing device is combined with a relay device, which during the tracing interconnects a predetermined number of such metal strips in such a way that a capacitive coupling is obtained between the contact springs and a common point, where the indicating device is connected, whereby testing of an arbitrary number of contact springs can simultaneously be obtained.

In a similar way, according to a preferred embodiment of the invention, all the metal strips belonging to a complete crossbar switch are interconnected, so that indication of the presence of a tone-carrying connection within the crossbar switch as a whole can be obtained. The locating of a tone-carrying conductor or coupling point within a large group of connections or coupling points respectively, for example including one or several crossbar switches, may be carried out in such a way that first all the metal strips in each crossbar switch are interconnected and (successively) for one crossbar switch at a time, connected to the indicating device, whereby the latter will indicate within which crossbar switch the tone-carrying conductor is situated. As soon as this crossbar switch has been found, a switch-over takes place, whereby instead the metal strips belonging to one holding magnet unit at a time are connected to the indicating device, until the holding magnet unit which contains the tone-carrying conductor is found. Then the metal strips of this holding magnet unit are one at a time connected to the indicating instrument, until the metal strip is found, the contact layer of which contains the tone-carrying contact. Finally, one contact at a time of the contacts belonging to this contact layer is connected to the indicating device, until the contact carrying the tone is found. The individual contact connections are made in the normal way by actuation of the bars selecting and holding magnets.

As has been mentioned already the invention is particularly well suited for the location of faults in automatic telephone systems, when a connection path has been interrupted. In this case an alternating current is connected at some point along the communication path, as for example at an arbitrary exchange. The indicating devices are then arranged in such a way that they either, simultaneously, at all the possible exchanges, or successively, at one exchange after the other, determine where the alternating current passes. Thus an indication of the route or line along which the connection has passed as well as an indication of the point or part of the connection where the interruption has occurred, are obtained.

The invention is also applicable to systems of subscribers' telegraphy, so-called telex, where an interrupted connection can be traced in a similar way. The invention is not limited only to the above-mentioned applications, however. It can of course be utilized wherever a plurality of connection routes or lines are available and it is desirable to be able to trace a certain connection route or line.

The invention will be more closely described and illustrated with reference to the Figures 1–11.

Figures 15–20 are to be matched to each other.

Figures 24–29 show a further detailed embodiment of the invention according to the principle shown in Figure 1.

Figure 1:
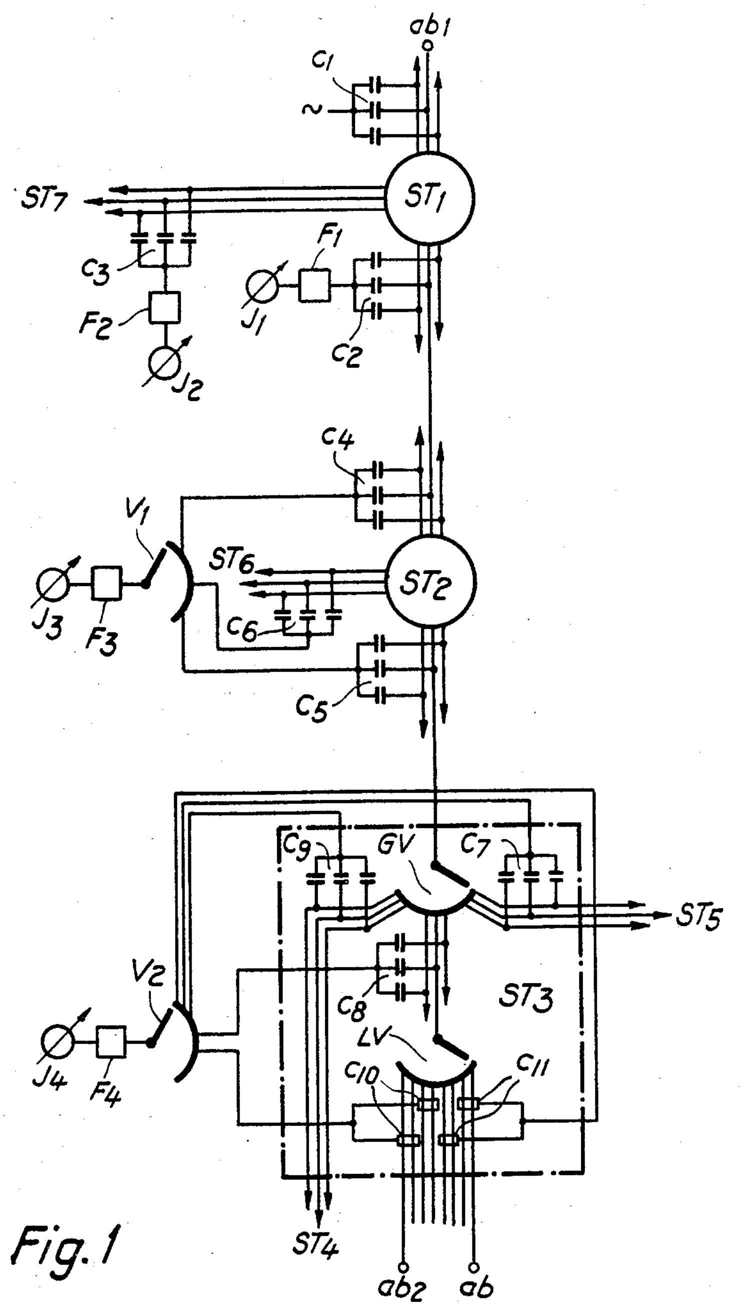
Figure 1 shows how the invention is applied to an automatic telephone system.

In Figure 1 three telephone exchanges are shown, ST1, ST2 and ST3, together with lines to the exchanges ST4, ST5, ST6 and ST7. The figure also shows a number of subscribers' sets, *ab*. The coupling to the various connections within the various lines is assumed to be obtained by means of the condenser groups C1—C11. Amplifiers, F1—F4, can be connected to each coupling device of this type. In Figure 1 alternating current is indicated to have been connected to the condenser group C1. To the amplifiers there are further connected corresponding indicator units, J1—J4. The exchanges ST1—ST2 are schematically outlined, while exchange ST3 is shown more in detail with a group selector GV, and a final selector LV.

It is now assumed that a subscriber, *ab* 1, has tried to obtain a connection to another subscriber, *ab* 2, at the exchange ST3 and that this connection has failed to reach the desired subscriber. The fact that the connection has failed has then been determined, in some known manner, for example: either by the subscriber reporting his failure to reach *ab* 2, or by an operator who has found the fault via an observation desk, or by the fault having been indicated by an automatic testing equipment.

Once the presence of a fault has thus been determined an alternating current, preferably of an audio frequency character, is manually or automatically transmitted over the subscriber line of *ab* 1. The indicating devices J1 and J2 which are connected to exchange ST1 will now indicate whether the connection has passed on through ST1, and if so, along what path. It may further be assumed that the connection has proceeded to exchange ST2. If so, this will be indicated by the indicator J1, as this indicator is connected to the line between the exchanges ST1 and ST2. When it has thus been determined at exchange ST2, a special control connection (not shown in the figure) can make the indicator J3 with its amplifier F3 at the exchange ST2 investigate whether the connection has been passed on also via this exchange and, if so, along what path.

At the exchange ST1 each connection line has been provided with an individual amplifier F1 and F2 with their indicators, J1 and J2, respectively. At each of the exchanges ST2 and ST3 only one indicating device, J3 and J4, respectively with its associated amplifier F3 and F4, has been provided. Successive connection is here arranged to the respective connection lines by means of the selecting devices V1 and V2, respectively.

When it has thus been determined at exchange ST1 that connection has been obtained with the exchange ST2, the abovementioned auxiliary control connection is made to operate also the selector V1. At the same time as the selector is stepped forward by impulses revertive pulses are transmitted via the control connection to exchange ST1 in such a way that an indication of the located tone-carrying connection is always obtained at this exchange. From J3 a special criterion is transmitted over the control connection, that is a tone frequency impulse indicating that the connection line has been located.

It is now assumed that this line passes on as far as to the exchange ST3. When the indicating device J3 has indicated that the tone has passed on towards ST3, the indicating device J3 causes a special signal to be sent from the exchange ST3, so that a similar locating procedure takes place at the exchange ST3. Over the now established connection to exchange ST3 from ST1 via ST2 an indication is obtained at ST1 showing what way the connection was passed at ST3 in manner analogous to the one already described for exchange ST2.

The exchange ST3 has, however, as has been mentioned above, been shown more in detail in Figure 1 than the other stations. On this account it is now assumed that the connection—instead of proceeding directly to the subscriber *ab* 2—has entered the route leading to the exchange ST5. When, therefore, the selector V2 is set to the position which is connected to the condenser group C7, an indication is obtained at exchange ST1 which reports that the connection has passed this way.

At the exchange ST3 the indicating device with its selector V2 may have been connected not only to the lines leading to other exchanges but also to certain lines within the exchange and to certain bunches of subscribers' lines. It may here be found suitable to arrange the tracing in a number of stages, that is, one stage tracing the lines leading to other exchanges and another stage tracing the lines within the exchange. By tracing within the exchange, the way selected by the connection, and how far along this way the connection has passed, are indicated. When tracing within an exchange it is suitable to let the locating device test all the lines once or several times, and when the indicating device marks the connection path, have this indication transmitted to the exchange ST1. In this manner an indication is obtained both of which ways the connection has passed and of which ways it has not passed. The indication of arbitrary communication routes and lines can thus be obtained.

Figure 2:
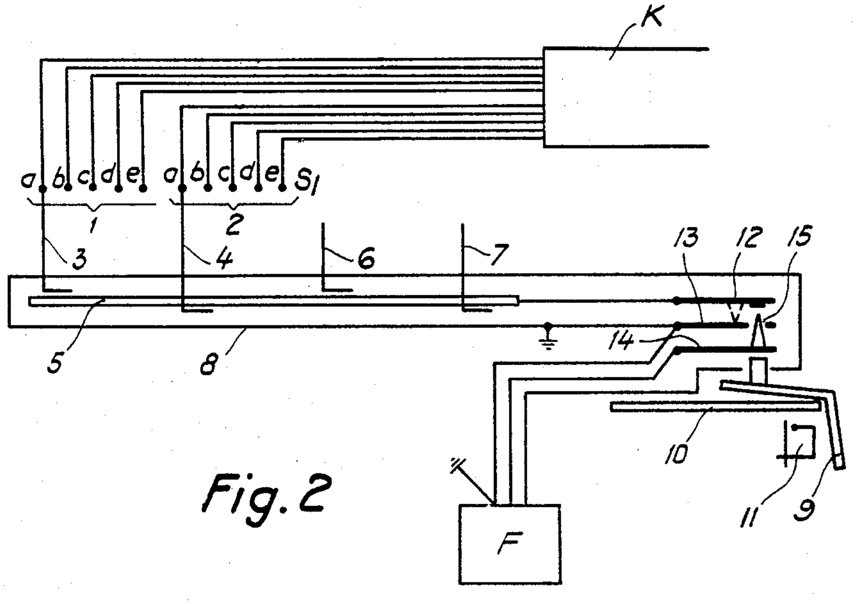
Figures 2–'9 show how the inductive and/or capacitive coupling can be arranged at a telephone exchange according to Figure 1.

Figure 2 shows how the capacitive coupling can be arranged to a connection route connected to a connecting strip, S1. To this connecting strip the conductors *a*, *b*, *c*, *d*, and *e* for a plurality of connections occurring at a telephone exchange are connected in the usual way. Only two of these connections, 1 and 2, are shown in the figure. To each *a*-conductor a wire has been connected which forms a capacitance with a common conductor 5 which is connectable to the amplifier F. Thus to the *a*-conductor of the connection 1 the conductor 3 has been connected, to form a capacitance with conductor 5. Similarly, to the *a*-conductor of the connection 2*a* conductor 4 has been connected, to form a capacitance with the common conductor 5. In the same way a desired number of conductors (6—7), are connected to the connecting strip, and form capacitances with the common conductor 5. When an alternating current is transmitted, that is over the conductors *a* and *b* belonging to the connection 1, a voltage is obtained over the above-mentioned capacitances between the conductor 5 and earth in such a way that the voltage is fed to the input side of the amplifier F, which is connectable between the conductor 5 and earth, and an indicating device, connected to the amplifier can make the desired indication. In order to prevent disturbances as far as possible, the above capacitances and the conductor 5 may be surrounded by an earthed screen 8. As appears in Figure 2 a certain connection is obtained between the *a*-conductors belonging to the different connections over the above-mentioned capacitances. On this account these capacitances must not be set too high. If, on the other hand, they are selected too small, a too small amount of energy will be transferred from the connection, so that the amplification of the amplifier has to be selected high. This increases the risk that the indication will be disturbed. For these reasons the magnitude of the capacitances has to be selected to lie between the above-mentioned limits. In telephone communications capacitances of up to 20 pF will not cause unpermissible crosstalk. Risk of disturbance due to too high amplification will generally not arise until the capacitance lies below 0.1 pF. A suitable value for the capacitance will therefore lie between 5 and 10 pF, approximately. Naturally, the value required of this capacitance for good transmission of energy to the amplifier will depend on the length of the line to the amplifier, and on the capacitance per unit of length. The effect of the above capacitance on the circuit can in known manner be reduced by cathode connecting the first amplifier valve in the amplifier. A further reduction can also be obtained by means of using double screens on this line, in which case the screen next to the conductor from the amplifying stage in known manner obtains a suitable voltage from the cathode connected amplifier stage.

If a selecting device is used, in the manner described in Figure 1, to indicate the position of the connection contacts of a relay or other selector should be connected between the conductor 5 and the amplifier F, so that selection by means of said contacts can be arranged. In Figure 2 such a relay has been shown. The relay has an armature 9, a bridge 10, a core 11 and 3 contact springs 12, 13 and 14. The contact of the springs 12 and 14 are separated when the relay is in non-operated position, and, consequently, when the relay is in this position, conductor 5 is not connected to the amplifier. The contact spring 13 is placed between the springs 12 and 14, and is earthed in order to reduce the capacitive coupling between these contact springs to a considerable degree. The contact of the contact spring 14 passes through a hole 15 in the spring 13.

When the relay is non-operated, the conductor 5 may be earthed, so that, disturbances occurring in spite of the screening from corresponding conductors 5 belonging to other routes will be considerably reduced. Such a connection to earth is shown in Figure 2 as a dashed-line contact between the contact springs 12 and 13. In order to obtain a low and constant contact resistance at the contact passage between the amplifier F and the condenser groups (between the contacts 12 and 14) a resistance (not shown in Figure 2) is connected between earth and the conductor 5 in the condenser group, so that the grid current from the first valve in the amplifier, or the current from a separate circuit, flows through the contacts, when the relay is operated.

In telephone systems where voice transmission occurs between two conductors, *a* and *b*, which are balanced to earth, the coupling to the amplifier F must be made mainly from the *a*-conductor, or mainly from the *b*-conductor, not from both conductors simultaneously, because otherwise only one capacitive middle point in a phantom circuit to earth will be obtained, so that the indicating current to the amplifier F will be mainly zero. In the instance of considerable leakage from one branch to earth in such a telephone connection, different voltages will arise between the different branches and earth. An indication of this phenomenon can be obtained if one amplifying device which incorporates an indicator is connected to the *a*-conductor at the same time as another amplifier is connected to the *b*-conductor. Alternatively, it is of course possible to use the same amplifier, now for the *a*- and now for the *b*-conductor, and then compare the amounts of energy obtained.

Figure 3:
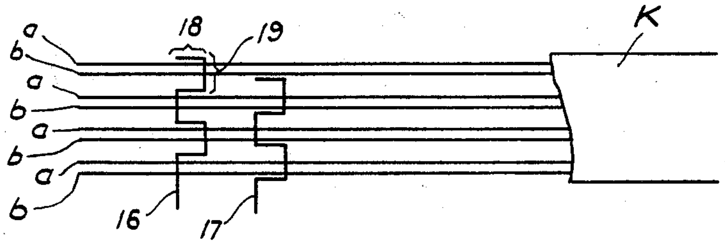

The coupling to the various conductors in a cable bunch may alternatively be arranged in the way illustrated in Figure 3, showing a cable K with a plurality of preferably insulated *a*- and *b*-conductors. The coupling to the *a*-conductors is made by means of a wire, or by the ribbon 16, and to the *b*-conductor by means of another wire, or the ribbon 17. These two wires or ribbons have portions 18 placed parallel to, or wound about their respective conductors while the portions 19, interconnecting the portions 18, extend substantially at right angles to the said *a*- and *b*-conductors. In this case the portions 18 form the above-mentioned capacitive coupling to the conductors in the cable. Such wires or ribbons may suitably be introduced in connection with the assembling of the cable.

Figure 5:
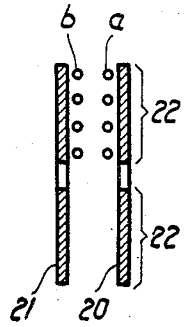
Figure 4:
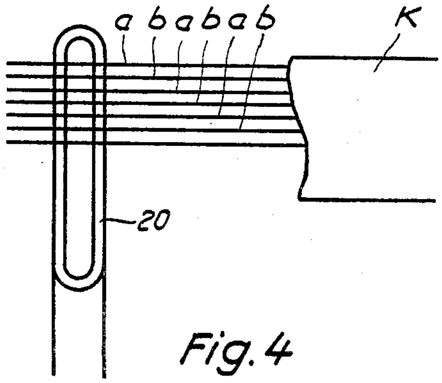

Figures 4 and 5 show how an inductive coupling to the conductors in a cable bunch may be established. As in Figures 2 and 3, the conductors are marked *a* and *b*. In order to catch the field from the conductors, a coil with the winding 22 has been arranged adjacent to the *a*-conductors, which have been bent to one side, and another coil 21 has been placed close to the *b*-conductors, which have been bent to another side. The coils are so arranged that the magnetic field from the respective conductors crosses the coil turns, so that a voltage is induced in the coil. The conductors from at least one of these coils are preferably connected to amplifiers by means of screened leads in the same way as has been described in Figure 2.

Figure 6:
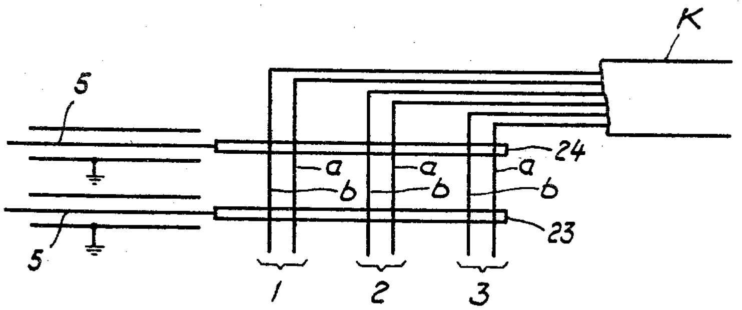

Figure 6 shows the same connecting strips (1 and 2) as Figure 2. The connection from the *a*- and *b*-conductors, respectively, to the selected conductors 5 is here established by the aid of ribbons 23 and 24. Ribbon 23 is insulatedly attached, that is by means of clamping or glueing, to the *a*-conductors, and ribbon 24 is insulatedly attached to the *b*-conductors. The *b*-conductors are bent away from ribbon 23 and the *a*-conductors from ribbon 24, so that e. g. the capacitance between the ribbon 24 and the *b*-conductors becomes considerably higher than that between the ribbon 23 and the *b*-conductors. This method of arranging a coupling to the conductors in a cable may well be applied on the part of the conductor immediately preceding a connecting strip or point.

Figure 7:
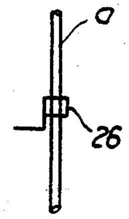
Figure 8:
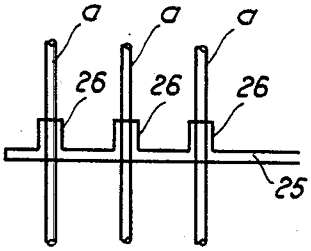
Figure 9:
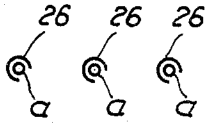

Figures 7, 8 and 9 show how a connection clip 25 with open lugs 26 can be clamped about the insulated conductors (of the *a*-branches). Capacitive coupling is here obtained between the lugs 26 and the respective insulated conductors. This coupling should preferably be situated immediately before a connection point, in the same way as has been described in connection with Figure 6 above.

Figure 10:
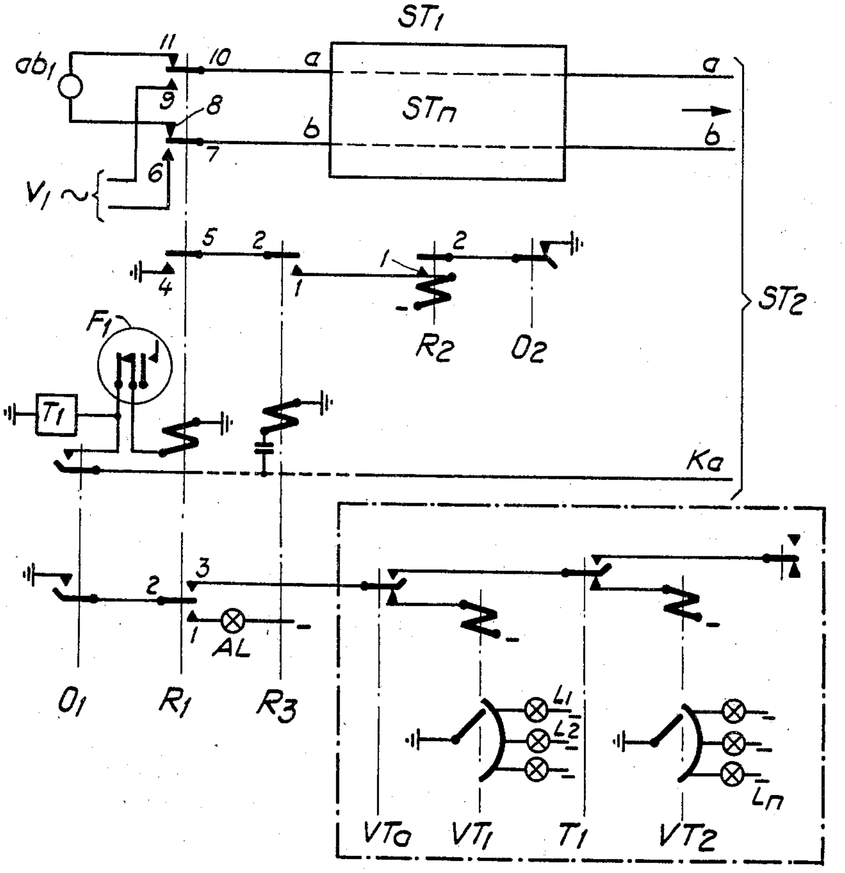
Figures 10 and 11 show more detailed coupling arrangements at two of the telephone exchanges in Figure 1.
Figure 11:
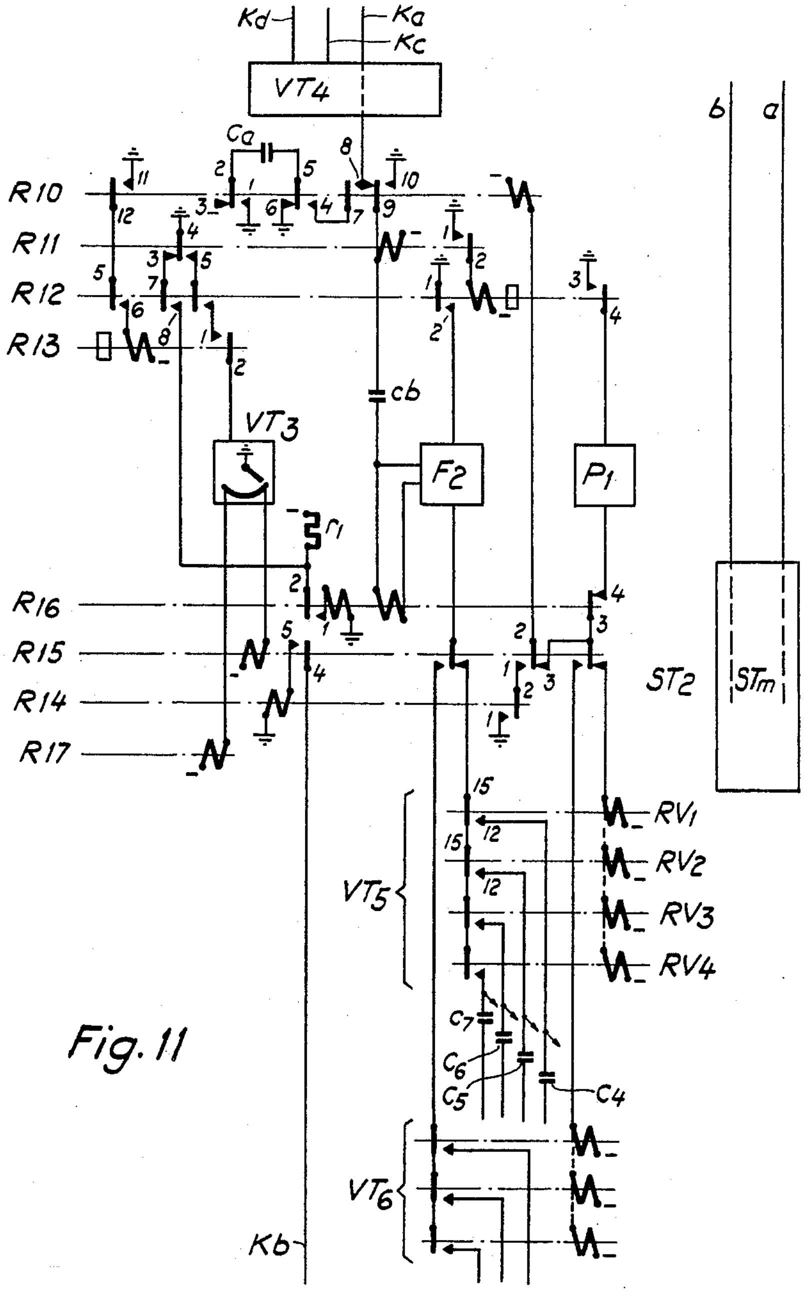

With reference to Figures 10 and 11 the manner in which a connection path is traced between the exchanges ST1 and ST2 will be described more in detail. According to Figure 10, ST*n* at exchange ST1 represents the normal connecting devices for a connection. In known manner these consist of selectors, connecting links, junctions etc. Over these connecting devices a connection from the subscriber *ab* 1 has been extended over the branches *a* and *b* to the exchange ST2 (see Figure 11). The equipment at the exchange ST1, which is required for an application of the invention, consists of a panel, T1 on which the various connection routes are indicated by means of the lamps $L_1$, $L_2$—$L_n$. The connection of the correct lamps is obtained by the aid of the selectors VT1 and VT2. Further, there is a starting switch O1, a release switch O2, an operator's telephone set T*t*, a dial F1 and three relays, R1, R2 and R3. It is now assumed that the connection has been traced as far as to the exchange ST2 and that the way which the connection has passed within this exchange has to be determined. Apart from its normal connecting devices [ST*m* (Figure 11)] the exchange ST2 has for this purpose been provided with the following devices; an amplifying device F2, which has already been mentioned in the description of Figure 1, an impulsing device P1, the selecting devices VT3, VT4, VT5 and VT6 and the relays R10–R17.

From the exchange ST1 a single-wire control connection K*a*, with earth as return conductor, has been arranged to exchange ST2. Also from other exchanges with which ST2 has traffic such control connections, K*c*, K*d* etc. have been arranged, which are all connected to a selector device, VT4. On calls over several of these control connections VT4 is in known manner made to connect them, one at a time, to the above-mentioned locating devices for the tracing of a desired connection. The selector VT5, which may suitably be designed as a relay selector with relays arranged as is described in Figure 2, successively connects the amplifier F2 to the various connection routes over the groups of capacitances C4, C5, C6 and C7 or other connecting devices for the arrangement of desired couplings, according to any of the examples illustrated in Figures 2–9. The selector VT3 switches over the tracing from one group of connection routes to another in the manner outlined in connection with the description of the devices at the exchange of ST3 in Figure 1. One group of routes is thus subjected to tracing by the selector VT5, the next group by VT6 and so on.

Figure 15:
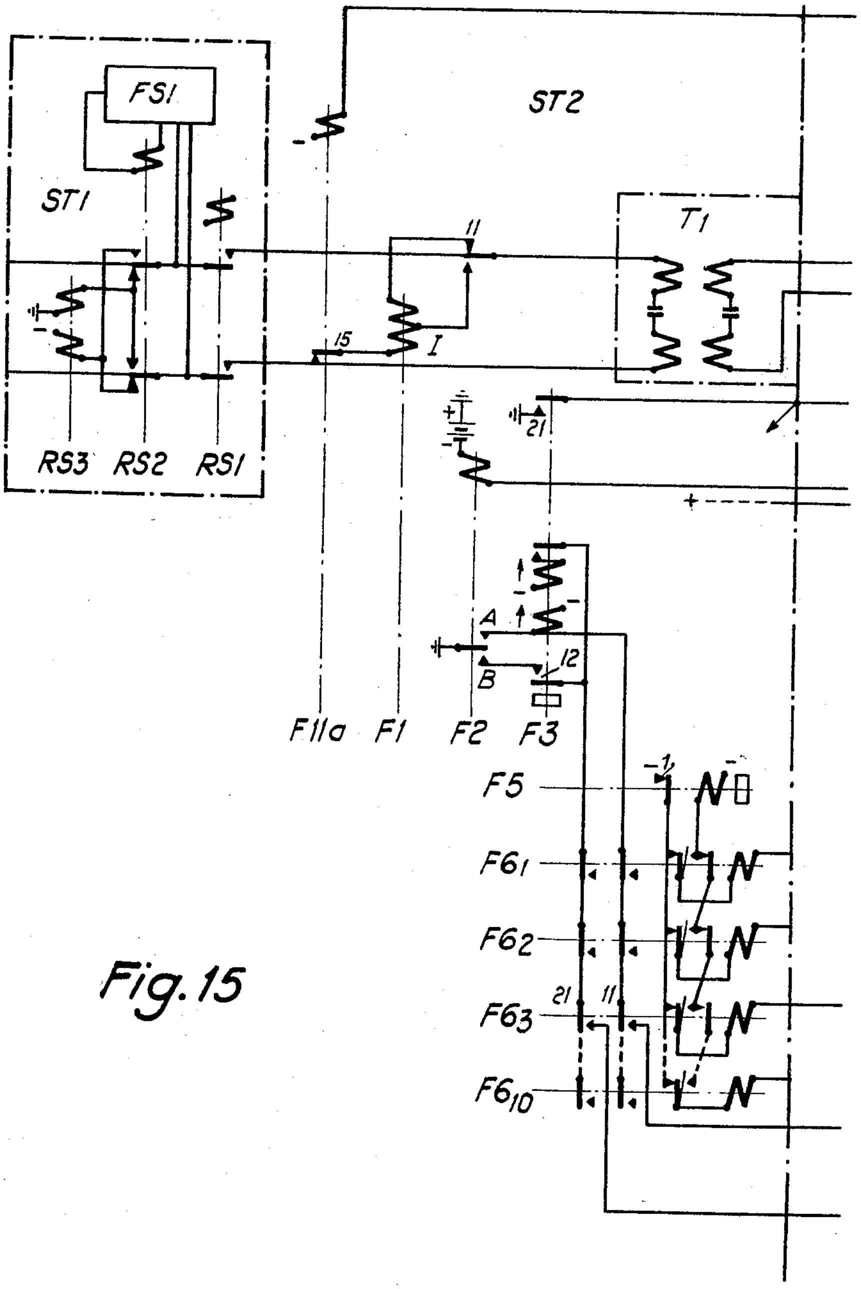
Figures 15–20 show a detailed embodiment of the invention applied in the manner schematically shown in Figure 1.
Figure 16:
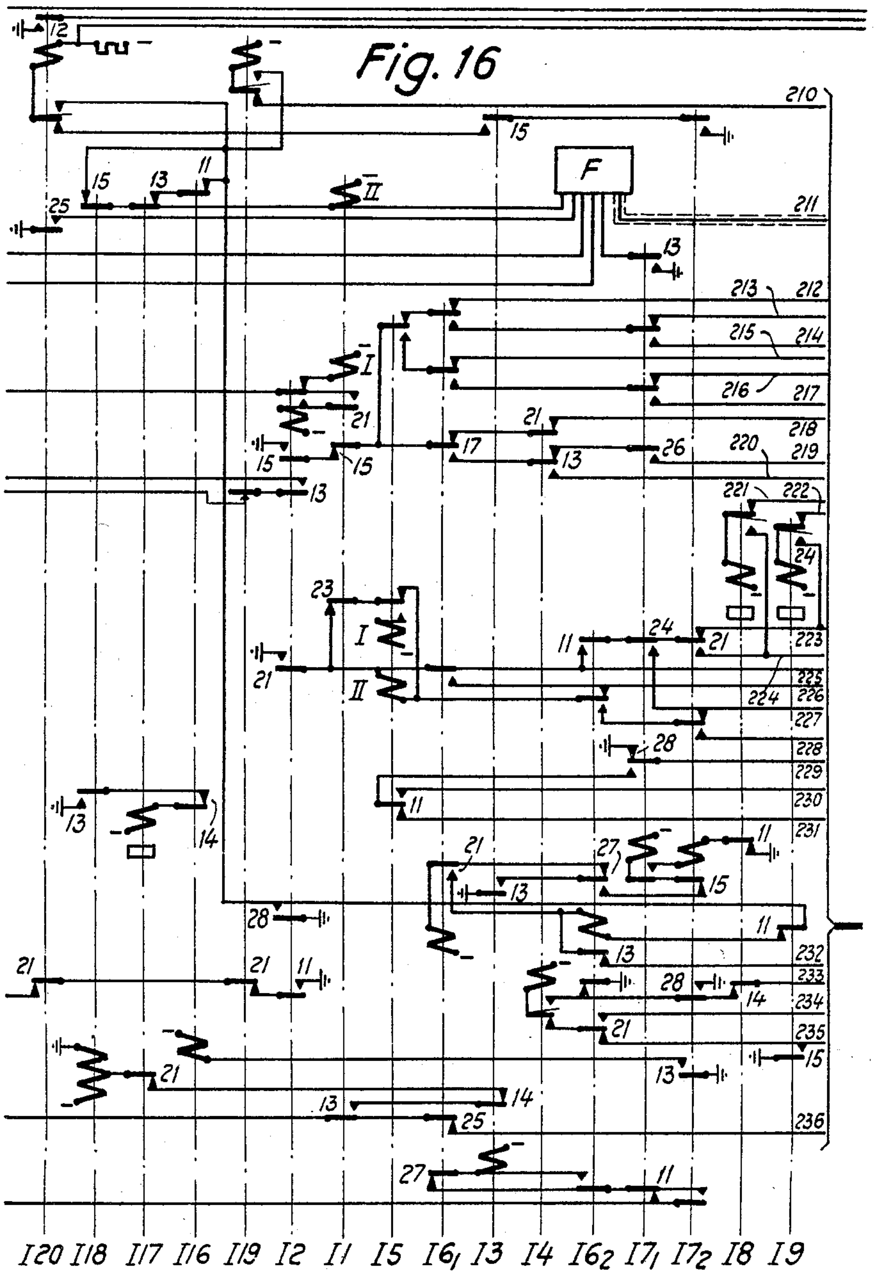

When a faulty connection is to be located the switch O1 at the exchange ST1, which in this embodiment of the invention is the controlling exchange is operated (Figure 10). Relay R1, which is a polarized relay, is then energized and lights the lamp AL. Relay R11 (Figure 11) is energized via the control connection K*a*, and operates. Over the two contacts of R11, 1 and 2, relay R12 is also made to operate. R12 now starts the amplifier F2 and the impulsing device P1 via the contacts 1–4. The indicating device which is connected to the amplifier F2, consists of the relay R16. The relays RV1—RV4 in the selector VT5 now operate, one after the other, in a manner as will hereinafter be described in connection with Figures 15–17. Thus relay RV1 operates first, followed by RV2 and then RV1 releases. When RV3 has operated RV2 releases and so on. When RV1 operates the condenser group C4 is connected. When RV2 operates, the condenser group C5 is connected and so on. At the same time as relay RV1 receives an impulse from the impulsing device P1 and operates, the relay R10 is also energized and operates. This makes a normally charged condenser C*a*, discharge over the control connection K*a* and earth with such a direction of current that the relay R1 operates in the opposite direction (Figure 10). This closes the following contacts of R1; —2, 3, 4, 5, 6, 7, 9 and 10; so that, on the one hand, alternating voltage V1 is transmitted over the conductors *a* and *b* and, on the other hand, current is transmitted to the selector VT1 which receives an impulse. A. C. voltage from the voltage supply VI is transmitted via the connecting devices ST*n* at the exchange ST1 and the conductors *a* and *b* to the connecting devices ST*m* at the exchange ST2. It is here assumed that the condenser group C4 is connected to the connection devices ST*m* which carry the above-mentioned A. C. voltage, so that this voltage is transferred to the input side of the amplifier F2. From the output side of the amplifier F2, alternating current is fed via condenser C*b* and the control connection K*a* to an A. C. relay R3 and to the operator's telephone set T1. If, therefore, alternating current is encountered on the connection route belonging to the condenser group C4, this will result in the operation of both the relay R3 and of the A. C. relay R16, which is also connected to the output side of the amplifier F2. The relay R16 cuts off the impulsing from P1 by means of the actuation of its contacts 3 and 4. Relay R3 operates relay R2 via the contacts 1 and 2. Relay R2 obtains holding current via its holding contacts 1 and 2 and via the switch O2. To the relay R2 the desired signal devices indicating that the connection route has been located, may be connected.

As the selector VT1 has advanced one step only, the lamp L1 is lighted, which indicates that the connection route at exchange ST2 includes the connection in question.

If no voltage had been obtained from the condenser group C4 the relay RV2 would of course have been operated by the next impulse, and would have connected the condenser group C5 at the same time as the selector VT1 would have advanced one step to the lamp L2. This procedure would have been repeated until the connection in question had been found, when relay R16 would have been operated in the above-mentioned manner, and would have stopped the tracing operation. Relay R16 receives holding current over a special holding winding through its contacts 1 and 2 and the resistance *r*1.

During the time which the impulsing lasted the slow-releasing relay R13 was energized via the contacts 11 and 12 of R10 and 5 and 6 of R12. When the impulsing stops, that is when the tracing by means of the selector VT5 has ceased, relay R13 releases causing the selector VT3 to advance one step, because the contacts 1 and 2 of the relay R13 are opened. The selector VT3 now actuates the relay R15 which operates and shifts the tracing over to selector VT6. As has been described already this last-mentioned selector may either be situated at the exchange ST2—if further tracing is required there—or it may be situated at another exchange. If the tracing is made at another exchange, current is simultaneously transmitted over the control connection K*b* through the contacts 4 and 5 of R15. The contacts 1 and 3 of relay R15 switch over the energizing circuit of relay R10, so that this relay is operated through the contacts 1 and 2 of relay R14, that is by impulses from the next exchange. If a condenser is simultaneously connected between the connection K*b* and K*a* through the contacts of relay R15 (not shown in the figure) signal current from the next exchange may be transmitted to the operator's telephone set T1 and to the relay R3 at exchange ST1. When the indication at exchange ST1 is observed, relay R2 is released by means of the switch O2 and the selector VT2 is connected by operation of the switch $VT_a$. Indication can now be received again. Next an impulse is dialled on dial F1, causing relay R11 to release momentarily and short-circuit the holding winding of relay R16 by plus potential through the contacts 3, 4 of R11, 7 and 8 of R12. This will result in a repetition of the same tracing procedure as has been described above by means of the selector VT6. In this way the connection can be traced through any number of stations.

If the subsequent tracing is to take place automatically, the holding circuit of relay R2 passing over the switch O2 is removed. Further a slow-releasing relay is introduced which is energized through the contact 3 of R1. This relay which releases when an impulse series from relay R10 stops, can in turn operate still another relay through a contact of the selector VT1, which is closed as soon as the selector leaves its normal position, and cause a switch-over from VT1 to VT2. For this purpose the relay R16 should also be provided with a slow-releasing auxiliary relay which will keep the circuit to the impulsing device open for a sufficiently long period to allow the switch-over from selector VT1 to VT2. The switch-over to still other selectors of the panel is made in a similar way as that from VT1 to VT2.

If the conductor from contact 8 of R12 is connected to still another selector (not shown in the figure), different settings on the selectors will be obtained for different figures. Different numbers on the dial, that is different settings of this selecting device, may then be given different means and effects. Two impulses may be used to carry out continued tracing of the communication path. Three impulses may effect the calling in of service personnel. Four impulses may be used to disconnect so-called time-supervising devices at an exchange. Five impulses may mean that the advancing of the selectors VT5, VT6, and so on, is to take place in the hunting exchange. The actual advancing from one selector to the next-coming (for ST1, ST2, ST3 and so on) may be effected by transmitting operating signals over the special control connection, for instance that a certain digit consisting of one impulse only is dialled on the dial F1.

The control connection which thus forms a selective network may of course well be a 2-wire connection. In this way disturbances from earth can be avoided. With a 2-wire connection we obtain by the earthing of one or both branches, in known manner, the possibility to transfer at least one special criterion between the exchanges. This criterion can then be replaced by one of the signals transmitted by means of the dial, as has been described above. In the embodiment according to Figures 10 and 11 the impulsing devices for the advancing of the selectors are arranged at the exchange which traces a communication path, and revertive pulses are transmitted to the transmitting exchange. Alternatively, it is of course possible to arrange an impulsing device at the transmitting (controlling) exchange. The impulses from this impulsing device are in this case transmitted to devices according to the invention at the exchange in question over the control connections. This may, for instance be achieved by means of the previously mentioned earth impulses, or else by means of impulses corresponding to the dialling impulses, or by means of any other known device for the transferring of impulses.

The tracing of a connection route can alternatively be carried out by the aid of a cross-bar switch instead of the relays RV1–RV4 in Figure 11. Such a design is shown in Figures 14–20.

Figure 14:
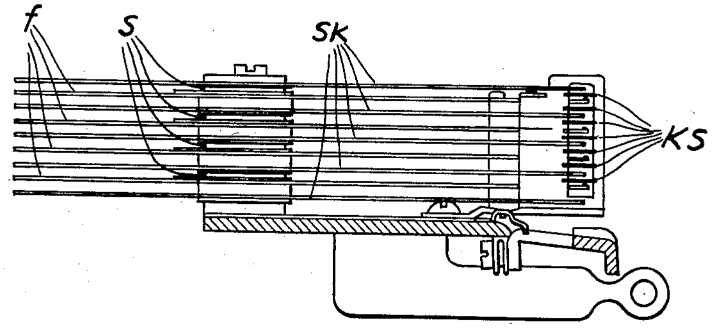
Figure 14 shows a crossbar switch holding magnet unit for use as a capacitive coupling device.

The crossbar switch, a holding magnet unit (vertical unit) of which is shown in side view in Figure 14, has for the purpose of this invention been constructed in the following way: metal strips, S, interposed between the contact spring, layers *f* at the attachment sites of the springs are provided with terminals for the connection of the amplifier device. The capacitance between each contact spring *f* and the adjacent metal strip S amounts to 10–25 pF, and offers the desired coupling between each of all the contact springs of the spring layer and the metal strip in question.

Each contact spring is further connected to its separate line conductor, for example the *a*-conductor, in the group of lines within which a connection is to be located. A layer of contact springs together with its associated metal strip S and contact bar KS constitute a unit, below termed a contact unit. In order to prevent capacitive coupling between the various contact units, a screen plate, S*k*, has been arranged between units neighboring each other.

Figure 17:
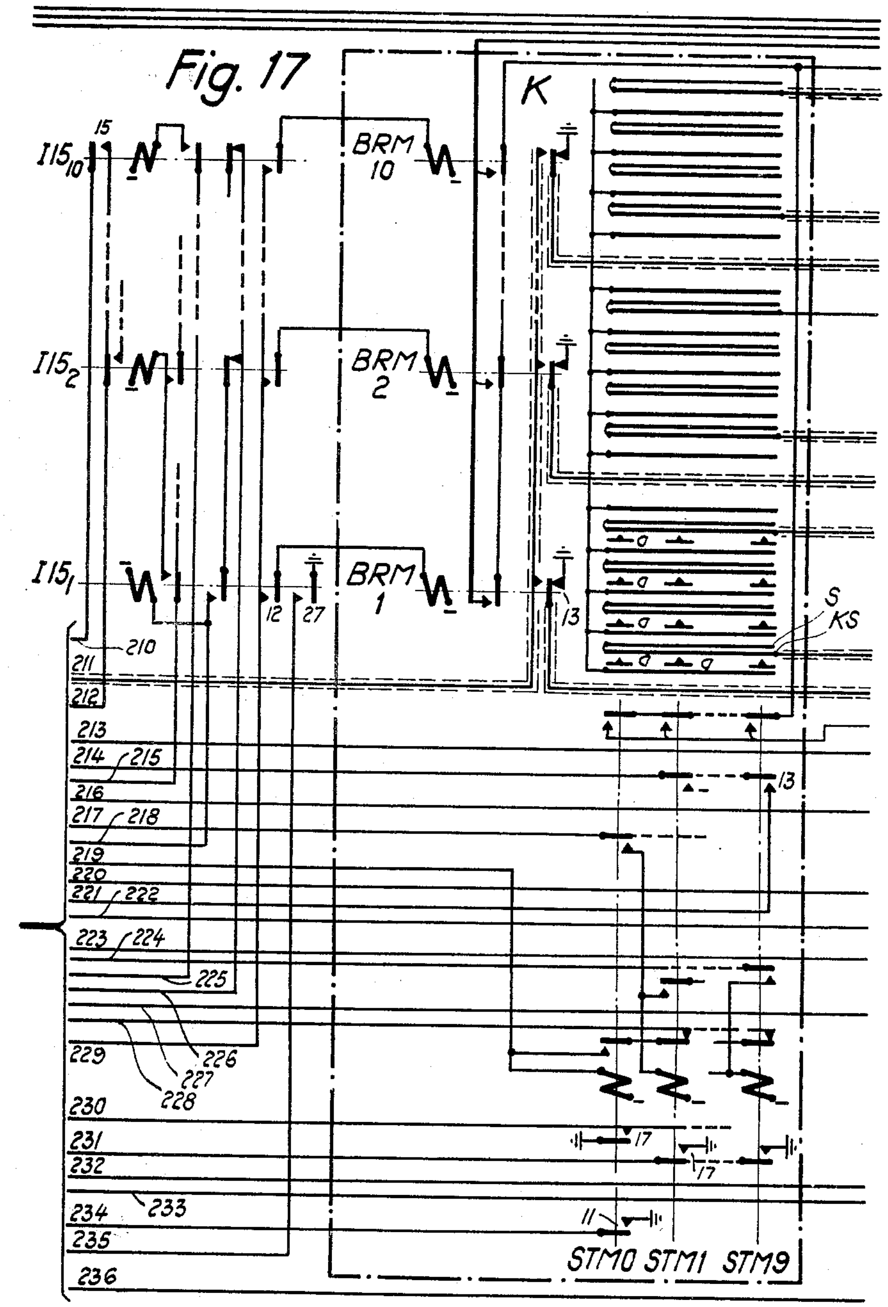
Figure 18:
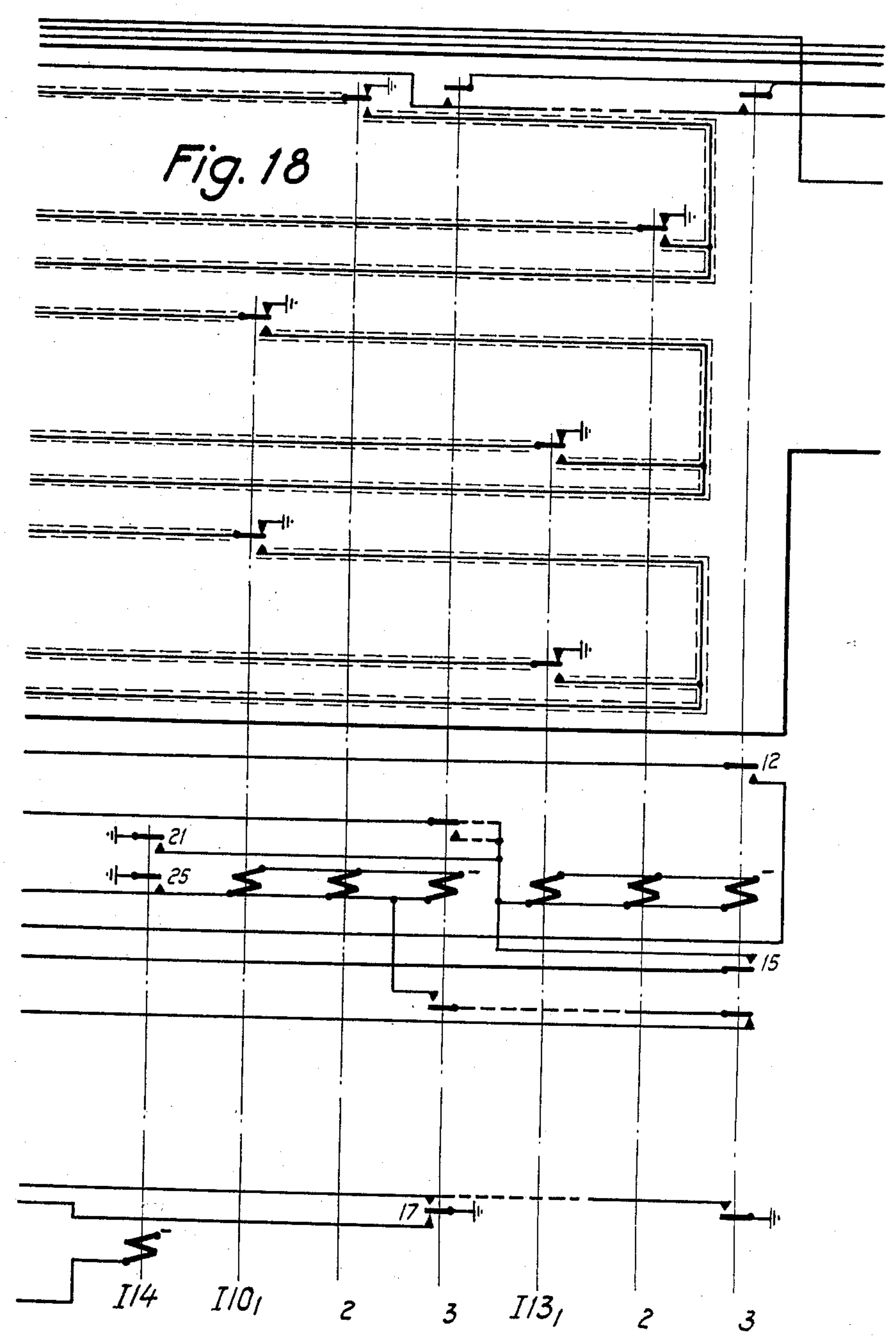

The tracing of the connection is here carried out in such a way that the metal strips, S, belonging to a holding magnet unit in a crossbar switch, are interconnected and connected to a frequency selective amplifier of above-described type. In this way an indication is obtained in the event anyone of all the lines or connecting devices associated with the holding magnet unit carrying the transmitted audio-frequency current. Next the metal strips S are disconnected, one at a time, from the amplifier or connected to the same, also one at a time, until the strip which contains the transmitted tone is located, upon which indication takes place. Finally the amplifier is connected to the contact bar KS belonging to the metal strip S carrying the tone. Selecting magnets of the switch are successively operated in combination with repeated operations of the holding magnets so that the individual contacts *f* are in turn connected to the amplifier. The amplification of the amplifier is reduced during this final hunting, as direct contact will now be obtained with a conductor included in the traced connection. Each metal strip and the corresponding contact bar KS may be permanently interconnected (according to Figures 17–18) so that switching-over of the amplifiers is unnecessary. In the detailed version in Figure 16, there is shown a relay set which, on the one hand, selects—one at a time of a number of such crossbar switches with their auxiliary relays, in the following called the identifying device, and, on the other hand, operates this device during the locating procedure and, finally, transfers information in accordance with the operations required for the tracing between the controlling exchange ST1 and the exchange ST2. In Figures 17–18 there is a schematic outline of a crossbar switch K of the type described above and of auxiliary relays for the connection of the various holding magnet units and metal strips during the locating procedure.

Figure 19:
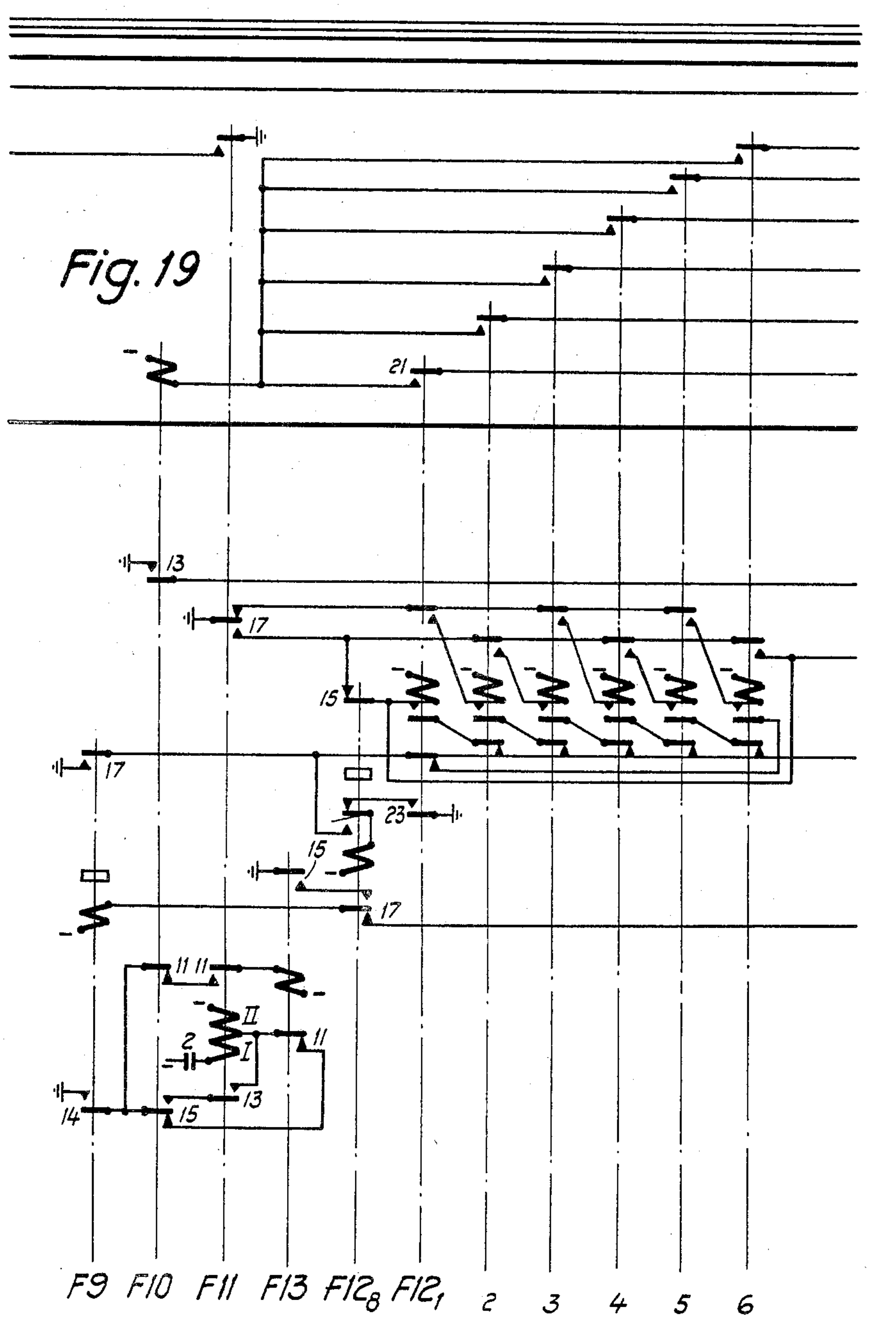
Figure 20:
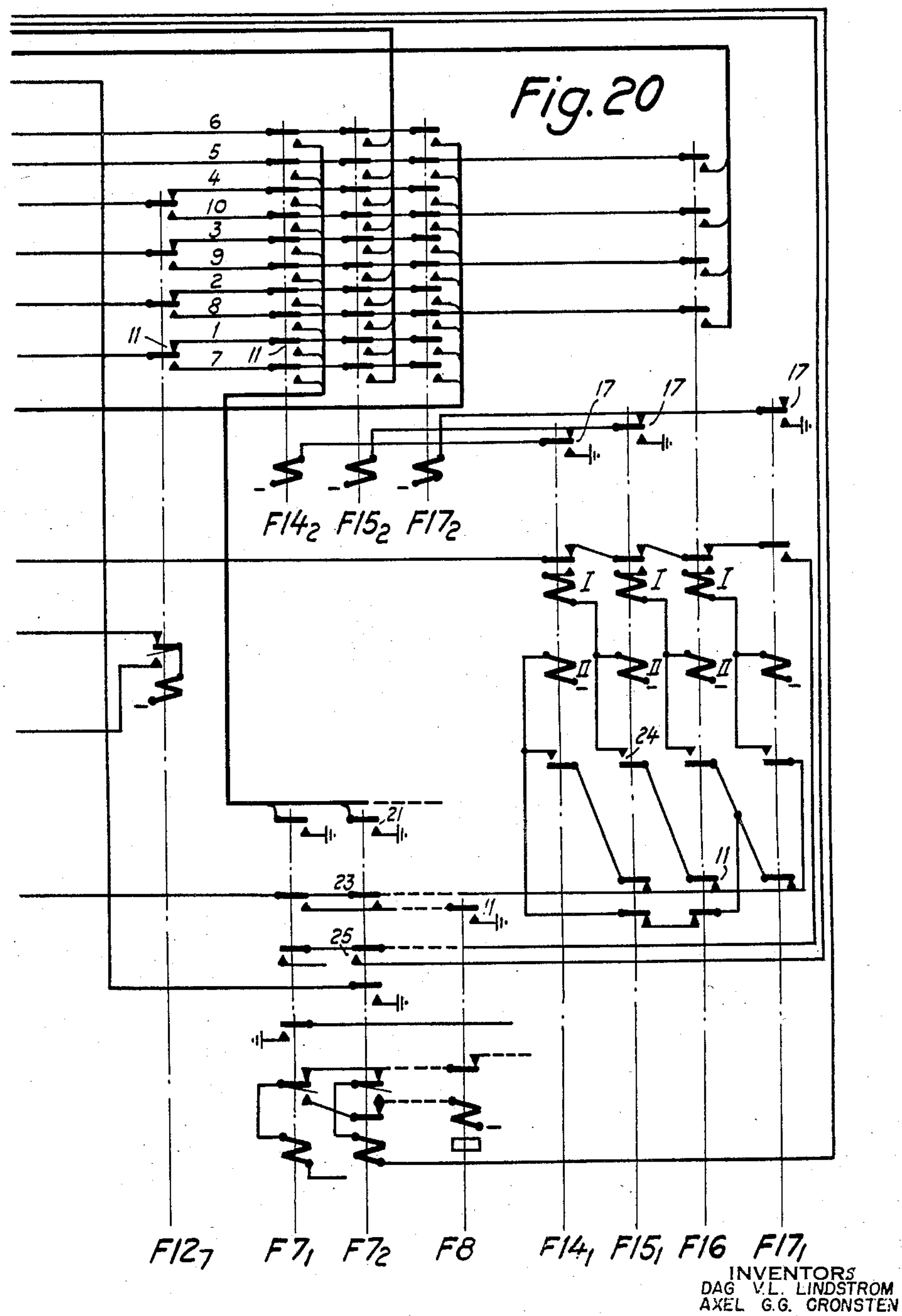

In Figures 19–20 there is shown a relay device designed in such a way that identifying impulses are transmitted to exchange ST1 indicating characteristic figures of the identifying unit, holding magnet unit, strip and contact in the crossbar switch, where a desired connection has been located. In the cases where tone is found on several contacts in the selector, the identifying device need not start again from the initial position but can proceed successively with the tracing. The relay set, in the following termed the counting relay set or device, is arranged according to Figures 19 and 20 to transmit impulses to exchange ST1 which impulses constitute the above-mentioned identification.

In the following a locating procedure will be described in detail. From the exchange ST1 a call is assumed to come in whereby current is supplied to the line by the starting relay RSI being operated, so that the polarized relay F2 is energized by current through both windings and moves to its A-position. This makes relay F3 operate. The contact 21 of F3 is closed and the relays I1 of all the identifying devices operate. Relay I1 in turn operates relay I2 through contact 21. The first relay I2 in the identifying devices is provided with a make contact 13, and as soon as the first relay I2 operates the circuit for relay F2 is closed through the said contact 13.

Relay F2 cuts out the upper winding of F1 so that the winding I of F1 only is in circuit, which forms the calling signal, which is transmitted to the exchange ST1. Through contact 11 of relay I2 and the break contacts 119 and 120, relay $F6_3$ is made to operate. Relay $F6_3$ operates over a preference chain which prevents more than one F6 relay operating at a time. $F6_3$ then operates relay F5, which is a common blocking relay, with the result that only one of the identifying devices obtains connection to the control connection. By the closing of contact 28 of relay 12 holding current is supplied to winding II on relay I1. Through the contacts A of the relay F1, 11 of $F6_3$, 13 of I1, 14 of I3, and 21 of I17, the circuit for relay I18 is closed, which operates and starts the impulsing. Through contacts 25 of relay 16, relay I14 also operates, which in turn causes the operation of the group relays $I10_1$–$I10_3$ and $I13_1$–$I13_3$ through contacts 21 and 25. These prepare the connection of the metal strips (S in Figure 14) of a holding magnet unit to the amplifier. When relay I18 operates relay I17 operates with delayed action through contact 13 of relay I18 and contact 14 of I16. When relay I1 releases due to contact 13 of relay I17 being opened, also relay I18 and then I17 will release. Relay I1 now operates for the second time. The relay group I1, I17 and I18 constitutes the impulse relay set. The impulses are transmitted partly with an impulse length of 100 milliseconds, and partly with an impulse length of 500 milliseconds. The long impulse length is obtained when relay I17 operates due to I16 being in the non-operated position. The shorter impulse length is obtained when I16 is operated so preventing I17 from operating. At the first release of relay I1, relay $I15_1$ operates to positive potential from contact 15 of relay I2, contact 15 of I1, contact 17 of $I6_1$, contact 21 of I4 to the winding of relay $I15_1$. Through contact 12 of $I15_1$ the holding magnet BRM1 is operated, and through contact 27 of relay $I15_1$ relay I4 is also operated and takes holding current through contacts 14 of I8 and 17 of $I10_3$. Through the operation of the holding magnet BRM1 the *a*-wires of the first holding magnet unit are capacitively coupled through the respective contacts of relays $I10_1$ and $I13_1$ and through contact 13 of BRM1 to the amplifier F. After the amplification the amplified tone is transferred to the branches of the control connection through the transformer $T_1$. When relay I1 operates again relay $I15_1$ obtains holding current through the winding II of relay I5, which makes also relay I5 operate. When relay I1 releases again, relay $I15_2$ operates and $I15_1$ releases. The holding magnet BRM1 releases at the release of relay $I15_1$ and the holding magnet BRM2 operates at the operation of relay $I15_2$. At the operation of BRM2 the *a*-wires of the next holding magnet unit are connected. The connection is also here achieved by capacitive coupling to the *a*-wires. The advancement of the relays I15 and the holding magnets then continues, so that the different holding magnet units are successively connected to the amplifier. When in this way a holding magnet on being operated has connected to the amplifier a group of *a*-wires, one of which is associated with a faulty connection member, and accordingly transfers tone current at a frequency of 1700 p./s., the amplified tone is returned over the control connection to exchange ST1 (Figure 15), where it is reamplified in the amplifier FS1, and causes the relay RS2 on the output side of the amplifier to be operated.

On its operation, relay RS2 effects current reversal on the control connection, so that the polarized relay F1 at exchange ST2 switches over from its A- to its B-position. Plus potential in the B-position of relay F1 is extended through contact 12 of F3, 21 of $F6_3$, 11 of $I7_1$ and 27 of $I6_1$ and through the winding of relay I3, so that this relay operates. When relay F1 leaves its A-position, the circuit is opened for relays I18 and I14, which both release. By the release of I18 the impulse set I1, I17 and I18 stops. Relay I1 remains in its operated position, while relay I17 releases. By the closure of contact 13 of relay I3, relay $I6_1$ is operated and cuts off relay I3 through contact 27 of $I6_1$. Relay I3 releases. At the same time relay $I6_1$ obtains holding current through its contact 21 and through contact 13 of $I6_2$ and the make contacts of the relays $I10_3$—$I13_3$. By the operation of relay $I6_1$ the impulse relay set is shifted over from the holding magnet units to the group relays I10—I13. The already operated relay I15 obtains holding current through contact 21 of I2 by means of a holding contact (not shown) connecting the winding to conductor 225. The holding magnet obtains holding current through contact 12 of I15. At the release of I14, when relay F1 moved from its A-position, also the relays I10 and I13 released. By the release of the relays I10 and I13 the shortcircuiting of relay $I6_2$ was broken and this relay operated. When relays I10 and I13 released the tone-testing circuit over the transfer contacts of relays I10 and I13 was interrupted. This causes the relay RS2 at exchange SI1 to release and send a current reversal signal to exchange ST2. Relay F1 then shifts to its A-position again. This makes the impulse relay set I1, I17 and I18 start to operate again, but this time for advancing the group relays I10 and I13. At the first release of relay I1 the group relays $I10_1$–$I10_3$ operate to current through contacts 15 of I2, 15 of I1, 17 of $I6_1$, 13 of I4, and the windings of relays I10. At contact 17 of $I10_3$ the holding circuit is interrupted for relay I4, which releases. At the operation of relay I1 relay I5 operates to current through winding II in a circuit which also provides the relays $I10_1$–$I10_3$ with holding current. The advancement of the relay chain I10–I13 then takes place in substantially the same way as the above described advancement procedure of the relays I15, this chain is shown only schematically in the drawing and not in detail. When the various relay I10–I13 operate various metal strips (S in Figure 14) are capacitively coupled through the transfer contacts of the relays in question, to the amplifier through contact 13 of the already operated holding magnet. The amplified tone is transferred through the transformer $T_1$ to the tuned amplifier FS1 at exchange ST1. Thus when a metal strip S, coupled with a connecting member transferring the tone, is connected through some of the relay I10–I13, a current reversal signal is sent from exchange ST1 which switches relay F1 over to its B-position. When relay F1 leaves its A-position, the impulse set I1, I17 and I18 stops. Over the B-position of relay F1, relay I3 operates through contacts of relay F3 the relays F6, $I7_1$, and $I6_2$. When relay 13 closes relay $I7_1$ operates over contact 13 of I3 and contacts 27 of $I6_2$ and 15 of $I7_2$. This causes the impulse circuits to change over from the group relays I10–I13 to the selecting magnets STM. The operated group relay obtains holding current through contact 24 of $I7_1$. At contact 11 of $I7_1$ the circuit for relay I3 is interrupted, which relay then releases. Relay $I7_1$ next obtains holding current through the winding of relay $I7_2$ which then operates. By the closing of contact 13 of $I7_2$, relay I16 operates and cuts off relay I17 from the impulse set. The impulse length is thereby reduced to 100 milliseconds. Contact 28 of relay $I7_1$ also disconnected the operated holding magnet. Contact 13 of $I7_1$ reduces the amplification of amplifier F on account of the fact that the testing of the separate *a*-wire within the contact bar in question which is connected to the metal strip S is now to be made directly and not capacitively. The reduction in amplification causes relay RS2 to release due to weakening of the tone retransmitted to the exchange ST2, so that relay RS2 releases. A current reversal signal is then transmitted to exchange ST2, which signal returns relay F1 to its A-position. The impulse relays I1 and I18 will then begin to operate again, this time for advancing the selecting magnets STM. After the operation of each selecting magnet, the holding magnet operates and closes the field contacts of the holding magnet unit in question. When relay I1 releases the first time during this impulse series, the selecting magnet STM0 operates with current through contacts 15 of I2, 15 of I1, 17 of $I6_1$, 13 of I4 and 26 of $I7_1$. Current through contacts 11 of STM0 and 21 of $I6_2$ operates relay I4 which obtains holding current through contact 28 of $I7_2$. When relay I1 operates again, the selecting magnet STM0 obtains holding current through the winding II of relay I5, which makes I5 operate. The holding magnet BRM of the holding magnet unit in question now operates in the following circuit; plus, contact 17 of STM0, contacts 11 of I5, 28 of $I7_1$, contact 12 on the operated relay I15, the winding of $BRM_1$, minus. When the holding magnet operated the first *a*-wire in the 10-group in question was connected by metallic contact to the amplifier F through transfer contacts in the operated relay in the chain I10–I13 and through contact 13 of the operated holding magnet. When relay I1 then releases, the selecting magnet STM1 operates and cuts off selecting magnet STM0 in conventional manner. At the release of STM0 the operated holding magnet releases because contact 17 of STM0 is opened. When relay I1 operates again the selecting magnet STM1 obtains holding current, but relay I5 releases, because its holding circuit over winding I is interrupted at contact 23 of I1. The holding magnet is now again operated for plus potential from contact 17 of the selecting magnet STM1, this time through contact 11 of I5, 28 of $I7_1$, and 12 of the operated relay I15. The next *a*-wire in the contact layer is then connected to the amplifier. The continued advancing of the selecting magnets is then made in a similar way. When an *a*-wire, carrying tone, is connected to the amplifier, the tone is transferred to exchange ST1 in an only slightly amplified state. A current reversal signal is then sent to exchange ST2, so that relay F1 changes over to its B-position and relay I3 operates in the already described way. The impulsing is also stopped, as has been described already, when relay F1 leaves its A-position. Relay I20 operates through contact 15 of I3 and obtains holding current from plus at contact 28 of I2. Contact 21 of I20 opens, whereby relays F6 and F5 are caused to release. Contact 25 of I20 operates a cut-off relay in the amplifier, which breaks the connection to the transformer $T_1$. The relay in question obtains holding current through contact 15 of I18.

When relay I20 operates, its contact 12 is closed, and relay $F7_2$ operates, followed also by the operation of the blocking relay F8. Through the operation of these relays the counting device is connected. When relay F8 operates, its contact 11 is closed, and through contact 23 of $F7_2$, relay $F14_1$ is operated by current through series-connected break-contacts of the other relays F15, F16 in the chain, and relay F9 also operates to current through contact 17 of relay $F12_8$. On operation of relay $F14_1$, relay $F14_2$ operates also. Relay F11 operates through contacts 14 of F9, 15 of F10 and 11 of F13, F13 operates next through contact 11 of F11, F13 releases F11 and so on. The impulses generated by relays F11 and F13 on the one hand to advance relays F12 and on the other hand are repeated to exchange ST1 through contact 15 of slave relay F11*a*. By the first operation of relay F11, relay $F12_1$ operates to current through contact 17 of relay F11 and 15 of $F12_8$. Relay $F12_1$ in turn energizes $F12_8$ through its contact 23. The cut-off relay F10 is connected through contact 21 of $F12_1$ for testing, in order to decide in which of the identification devices location is to be made. The testing circuit is as follows: contact 21 of $F7_2$, contact 11 of $F14_2$, contact 11 of $F12_7$ and contact 21 of $F12_1$. During the continued impulsing the relays $F12_1$—$F12_6$ operate in turn each time relay F11 either releases or operates, and at the same time half-period impulses are transmitted to exchange ST1 by repetition by relay F11*a*. Rleay F10 is successively connected for testing contacts of the F12 chain. At the same time as relay $F12_1$ is going to operate for the second turn, relay $F12_7$ operates and changes the testing circuits from 1—6 to 7—10, 5, 6. When relay F10 operates after the connected identification device has been located by the relays F12, relay F11 remains in its position while the circuit for relay F13 is opened through contact 11 of F10. Through contact 13 of F10, relay $F15_1$ operates to current in series with winding I on the already operated relay $F14_1$. Relay $F15_1$ then in turn operates $F15_2$ through contact 17 of $F15_1$. At the release of relay F13, the circuit for relay F9 is opened at contact 15 of F13. Relay F9 then releases with delayed action, and when contact 17 of F9 is opened, the operated relays F12 release and after the relays F12, relay F10. When contact 14 of F9 is opened, relay F11 will release if it is operated. When relay F10 releases, contact 13 is opened, which results in relay $F14_1$ releasing and in $F15_1$ obtaining holding current through its contact 24 and through 11 of F16, 23 of $F7_2$ and 11 of F8. After the release of $F14_1$, $F14_2$ releases when contact 17 of $F14_1$ is opened. When relay $F12_8$ releases with delayed action, the circuit is closed for operation of relay F9 again through contact 17 of $F12_8$. At the operation of relay F9, the counting device is started once more, this time in order to determine the operated holding magnet. When the holding magnet unit has been located relay F10 operates and through contact 13 of F10, relay F16 will then operate to current in series with the winding I on the already operated relay $F15_1$. Relay F11 is kept in its position by its obtaining holding current through contacts 11 of F13, 15 of F10 and 14 of F9. Relay F13, on the other hand, releases, when contact 11 of F10 is opened. After delayed action F9 releases and then, as has been mentioned already, also the operated relays F12. Relay F9 operates when relay $F12_8$ releases, and thus the counting device is started once again, this time in order to determine the group of metal strips in question, that is the operated group, relay I10—I13. When this group has been located, relay F10 operates and this causes relay F17 to operate. Through contact 17 of $F17_1$ relay $F17_2$ is operated, and this connects the counting device for determination of the operated selecting magnet. The counting of the operated selected magnet is made in a similar way, and when relay F10 operates this time, the disconnecting circuit for the counting device is closed. The disconnection means that relay I20 is short-circuited and releases. The short-circuiting path is as follows: contact 13 of F10, break-contacts of $F14_1$, $F15_1$ and F16, and make-contacts of $F17_1$ contact 25 of $F7_2$ and the winding of relay I20. When relay I20 releases and its contact 12 is opened, relay $F7_2$ and F8 release and then all the remaining operated relays in the counting device.

When the identification device is now connected for the second time by the release of relay I20 and the closing of its contacts 21, relay $F6_3$ operates which in turn energizes relay F5, whereby the identification device is connected to the control connection. The identification device is now to continue the tracing successively. The amplifier, the amplification of which is reduced, when relay I20 closes its contact 25 and operates the cut-off relay of the amplifier, which will once again become connected with higher amplification, when the holding circuit is interrupted by the opening of contact 15 of I18 at the first impulse. The impulse relays I1, I17 and I18 begin to operate again in the same way as before. The impulses advance the selecting magnets to the final position during simultaneous testing. The holding magnet operates, as has been described above, with the same timing as the selecting magnets, closing the various field contact groups. If it should now happen that there is still another connecting member in the tone-carrying connection within the same contact layer, a new call is made to the counting device, and disconnection is effected from the control connection. The counting device then operates in the same way as has been described already. It identifies the indicating unit, the holding magnet BRM, the metal strip S and the contact, in the order here given.

If there should be no or no further connecting member in the tone-carrying connection within the contact layer in question, relay I8 will be operated by the impulse after the operation of the selecting magnet STM9 through contact 13 of STM9. Relay I8 then obtains holding current through its own contact and through contact 21 of $I7_2$. When relay I8 is operated, the circuit for relays $I7_1$ and $I7_2$ is opened at contact 11 of I8. At contact 14 of I8 the holding current for relay I4 is cut off. When relays $I7_1$ and $I7_2$ release, the impulse circuit is changed over from the selecting magnets to the group relays I10—I13. At the same time the selecting magnet STM9 releases, and so does with delayed action relay I8, due to the opening of contact 21 of $I7_2$. During the continued impulsing the group relays I10 and I13 are now advanced during simultaneous testing on the remaining metal strips within the holding magnet in question. If it should now happen that any of the various metal strips contains a tone-carrying member, the advancing is stopped, as has been described before, and relays $I7_1$ and $I7_2$ operate once again, while testing is carried out on the individual *a*-wires belonging to this new metal strip. If, however, none of the metal strips within the holding magnet should contain any tone-carrying connecting member, relay I9 will operate for the impulse after the operation of relays $I13_1$—$I13_3$ through contact 12 of $I13_3$. Relay I9 obtains holding current through its own contact 24 and through 21 of $I7_2$ and 11 of $I6_2$. Relays $I6_1$ and $I6_2$ release through contact 11 of I9 and relay I4 operates through contact 15 of I9.

At the release of relays $I6_1$ and $I6_2$ the impulsing circuit is switched over from the group relays (I10—I13) to the relays $I15_1$—$I15_{10}$ controlling holding magnets for tracing in the remaining holding magnet units. When relay $I6_1$ releases the energizing circuit of relay I14 is closed at contact 25 of $I6_1$, relay I14 in turn operating the remaining group relay I10—I13. Relay I19 obtains holding current through its contact 24 and through contacts 15 of I13 and 21 of I14. The continued impulsing advances the holding magnets at the same time as testing on the different holding magnet units takes place. If it should now happen that the remaining holding magnet units include some member in the tone-carrying connection, the testing is continued on the various metal strips and, finally on the separate connecting members belonging to the connecting strip in question as has already been described above. If, however, there should be no member in the remaining holding magnet units, relay I19 will operate through contact 15 of $I15_{10}$ by the impulse after the operation of relay $I15_{10}$. Relay I19 is the disconnection relay of the identification device and the last relay I19 is provided with a break contact 22 breaking the circuit of relay F2. When contact 21 of I19 is opened, relays $F6_3$ and F5 release. As the operating conductor for relays $F6_1$—$F6_{10}$ is now again connected to minus-potential at contact 1 of $F5_1$ another identification device can be connected to the communication path. This results in windings of relay F1 being connected across the line. At exchange ST1 relay RS3 releases and later, so does relay RS1. Relay RS1 cuts off the line wires. Relay F1 returns to its middle position, which causes relay F3 to release and cuts off the common holding circuit for the relays I2 by means of opening its contact 21. When the relays I2 release contacts 13 of I2, release relay F2 and contact 28 of I2 breaks the common plus potential and the identification devices are released.

As will appear from what has been said above, the impulse-receiving device is connected to the amplifier only during a certain fixed period, that is during the time when alternating current is transmitted from exchange ST1. In this way the risk of erroneous indication due to the disturbing noise which is always present in the various connections belonging to a certain communication path, will be reduced. The amplifier should further be tuned for the frequency which is transmitted. In order to make the device still less sensitive to disturbances, the frequency of the alternating current should be selected to coincide as little as possible with the other frequencies which are transmitted over the different communication paths. Thus, if the invention is to be applied to telephone systems, the frequency should be chosen so that it does not coincide with the tones occurring in normal telephone traffic, for example buzzer tones, signal tones etc. The speech currents have a comparatively low amplitude in the top part of the voice frequency band, that is at about 2000 Hz. The frequency to be used in connection with this invention should therefore lie at this frequency range. As a further precaution against erroneous indication due to disturbances, the amplitude of the transmitted alternating current may be selected somewhat higher than the amplitudes of other alternating currents occurring in the connections. Finally, two frequencies can be transmitted simultaneously, or at fixed intervals, in which case the amplifying and indicating device is, in a manner known per se, arranged in such a way that both frequencies have to be present, simultaneously, or at fixed intervals, in order that indication shall take place.

Figure 13:
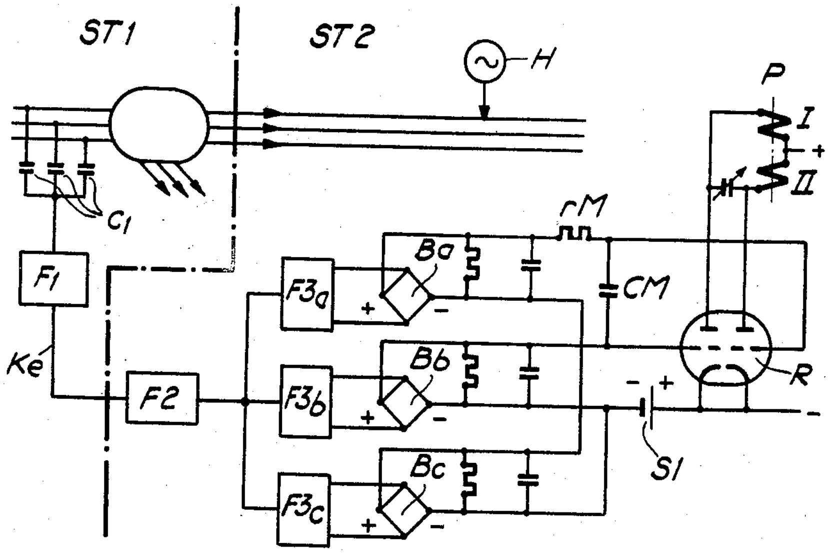
Figure 13 shows a filtering device included in the indication device for filtering of alternating current in the instances where tracing is carried out by the aid of alternating current which is to be selectively filtered from a number of possible connections.

Figure 13 illustrates an elementary diagram of an amplifying and indicating device, designed for one signal frequency. This device will largely eliminate the disturbances from the voice currents present in the bunch of conductors.

In the figure C1 designates coupling condensers of a bunch of conductors at the exchange ST1. To these condensers there is connected the amplifier F1 which contains a band pass filter with its minimum attenuation at a suitable frequency, for example 1700 Hz. This filter is assumed to pass the frequency band 1550–1850 Hz with low attenuation.

The amplifier F1 at the exchange ST1 is by means of a control connection K*e* connected to exchange ST2 which is shown in the right-hand part of the figure. At exchange ST2 the signal tone, for example 1700 Hz, is transmitted from the generator H over a connection, the path of which has to be indicated. This tone may instead be introduced at some other suitable point along the connection but if—as in the figure—it is available at the exchange where the indication takes place, an easy comparison of the frequencies is made possible, that is the chances for erroneous indication may be reduced by arranging the receiver to react to the traced tone only if it has the same frequency as the tone transmitted by H.

At the exchange ST2 the power incoming from K*e* passes through the amplifier F2, which contains another band pass filter, similar to that described above for the amplifier F1, to three band pass filters, $F3_a$, $F3_b$ and $F3_c$, possibly inserted between amplifier stages, and connected in parallel.

These band pass filters should possess good filtering qualities; they should only pass narrow frequency bands and have very high attenuation on the sides of these bands.

Without risking an unsuitable prolongation of the transient time it is possible with special filters to obtain frequency bands of some tens of Hz, so that the difference between the minimum and maximum frequency which any of the three filters will pass, will not exceed 100 Hz. This is an advantage, but also less expensive filters will do. On Fig. 13 F3*a* is assumed to have the least damping at 1600 Hz, F3*b* at 1700 Hz and F3*c* at 1800 Hz. The frequencies on both sides of the signal frequency (1700 Hz), which F3*a* and F3*c* pass, are rectified in the Graetz-bridges B*a* and B*c*. The sum of the direct currents from B*a* and B*c* are applied to the grid in one triode circuit in the double valve R.

The signal current and voice currents with the same or with adjacent frequencies are passed by the filter F3*b*, rectified in B*b* and the direct voltage is then fed to the second grid circuit in the double triode R. This triode has in some way been given a suitable grid bias e. g. by means of a voltage supply S1 shown in Fig. 13. The anode circuits of the valve are according to Fig. 13 connected to two mutually counteracting windings I and II of the relay P. If, therefore, for example, the signal frequency should be missing but the voice frequencies at C1 should contain frequencies resembling the signal frequency, the winding II will be energized, but the relay P will scarcely ever be operated because the effect of the current through the winding II is neutralized by current through the winding I. This is due to the fact that when voice currents exist within the pass area of F3*b* equally strong currents will at the same time, or at approximately the same time, exist in the adjacent frequency regions determined by the filters F3*a* and F3*c*. If, on the other hand, signal current is transmitted at the same time as voice currents with similar frequencies, the current through winding II will be greater than the current through winding I, and the desired indication will be obtained. It has turned out in practice that the windings I and II compensate each other better for the voice currents the closer the passing bands of the filters F3*a* and F3*c* lie to that of F3*b*. One of the filters F3*a* or F3*c* may possibly be dispensed with, but a certain deterioration in the above-mentioned compensation will then be the result.

The principle described above for eliminating disturbing effect from voice currents and noise occurring on the lines at the indication of the signal current is based on the fact that, when no signal current is transmitted, the present currents passed by the filters F3*a* and F3*c* stand in a certain relation to the currents passed by the filter F3*b*. With a moderate number of lines, however, appreciable momentary deviations from the presumed even distribution of the disturbing current may arise; and in order to avoid the polarized relay P in Fig. 13 being operated due to such deviations, it is suitable to cause an integration of the derived disturbing currents to be effected, so that the mean value for a longer time period is obtained. In the embodiment according to Fig. 13 there is for this purpose an integrating device comprising a condenser CM connected in series with a resistor *r*M. It has turned out in practice that a time constant of the integrating device amounting to 100 to 400 milli-seconds is sufficient in most cases.

When suitable, for example in case of shorter circuits or carrier frequency circuits, the alternating current may consist of high frequency current e. g. 250,000 c./s. The amplifying device will in such cases suitably be arranged as a beat frequency amplifier, so that an audible tone is obtained.

Up till now it has been assumed that all the exchanges in which indication takes place have amplifying and indicating devices operating at the same frequency or frequencies, respectively. On this account only one connection at a time can be traced. If it is desirable to trace a plurality of connections simltaneously, a greater number of amplifying devices will have to be used, operating at various frequencies and each having a control device, such as relays and selectors. The various amplifiers and indicators will here be connectable to their various panels or corresponding arrangements, possibly over different control connections.

On Figures 1 to 9 the coupling to the various connections has been indicated as made to a conductor for the *a*-branches and another for the *b*-branches in a telephone system. Naturally a mixing of the *a*- and *b*-branches can be coupled to a common conductor, provided only that the same common conductor is not coupled as powerfully to the *a*-branches as to the *b*-branches.

In the above described embodiments of the invention an alternating current supply has been connected to the connection to be traced, whereupon the locating device has traced the circuits until the connection in question has been located. The procedure can of course also be reversed, i. e. the connection points of the A. C. supply and those of the indicating device may be exchanged. The locating device is made to connect the control connection from one bunch of routes to another until the bunch in which the connection occurs is located on which occasion the indication is obtained. As the coupling between the end point of the control connection and the connection lines is comparatively weak, it may become necessary to pass—via an amplifier connected into the control connection—a sufficient amount of energy to the connecting lines not to jeopardize the indication on account of disturbances of various kinds. Disturbances may of course arise from the above-mentioned A. C. on the various connecting lines, but as the A. C. need only be applied momentarily and may be of a high frequency, these disturbances can be sufficiently reduced.

It is not always necessary, however, to transmit alternating current over the control connection. A direct current may sometimes quite well be connected instead of an alternating current. The coupling between the control connection and the various communication connections will then have to be arranged by means of connecting element suited for D. C., such as e. g. resistances. Both when A. C. and D. C. are used for the indication, the connection path can be forwardly traced on each side of the connection point of the indicating device, or of the current supply, respectively in opposite directions.

Indication by the aid of direct current is particularly well suited for tracing of connection paths in a net-work with good insulation, thanks to the simplicity of this method.

Figure 12:
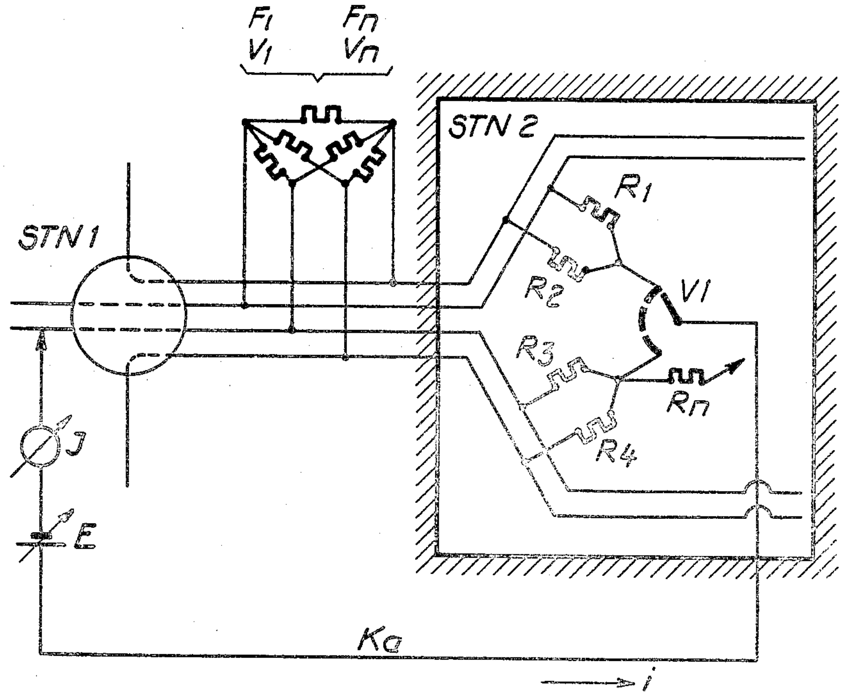
Figure 12 shows a device in which tracing is carried out by means of resistive coupling and D. C. tracing voltage.

On Fig. 12 the exchanges STN1 and STN2 and the control connection K*a* are illustrated. At the exchange STN1 a voltage supply is arranged, designated E, which also is the designation of its voltage, and there is also an indicating device J. At the exchange STN2 a selector device V1 is shown together with devices for coupling between the control connection K*a* and the various connection lines, which devices are in the form of resistances R1, R2, R3, R4—R*n*. Between the different conductors within a connection line as well as between the conductors of different connection lines, the existence of certain leakage resistances F1—F*n* and voltages V1—V*n*, which have also been outlined in the figure, is presumed. If these resistances F1—F*n* are high compared with the resistances R1—R*n*, respectively, and the voltages V1—V*n* are small as compared with the voltage E, it will be understood from the figure that a considerably greater current *i* will be obtained through the indicating device J, when the selector V1 and the indicator J are connected to the same circuit than when they are connected to different circuits.

The resistance R1—R*n* can also consist of non-linear resistances, such as dim glowing lamps, rectifiers etc.

If required by the need for protection against disturbances, both the indicator and the voltage supply can be synchronously connected by means of pulses at certain time intervals. If the pulse repetition frequency is selected sufficiently high, an alternating current will of course be obtained.

The resistances R1—R*n* may be connected to suitable points within the various connection paths. Alternatively, a suitable part of a cable, e. g. that next to a connecting strip, may be enclosed in a compound together with a metal strip. This compound should possess a certain conductive power, so that a desired resistance is obtained between the various conductors and the said strip. As the terminal ends of certain cable connections for example in connecting strips, always are arranged according to a certain standard design, a bar, plug or a similar device may be engaged with the same so as to obtain contact with a desired number of terminals. This strip or plug is equipped with resistors, or a compound according to the above between the different contact points thus obtained to a common bar, so that the desired resistance is obtained between the contact points and the bar.

Still another embodiment of the invention is shown in Figures 24–29. In this embodiment as in the one according to Figures 15–20 a crossbar switch is used for the tracing procedure. Recording at the controlling exchange is achieved by means of a relay set and a typewriter or some similar device. Also in this embodiment the tracing is carried out by groups with the aid of the crossbar switch and its relays, impulses from the minor exchange in question, ST2, ST3 and so on, being transferred to the controlling exchange ST1 where they indicate the progress of the tracing. The number characteristic of a located connecting member is determined and recorded at the control exchange. This is done simultaneously with the tracing, and, consequently, the locating device according to this embodiment of the invention works at a considerably high speed.

The said impulses which are transferred from the respective minor exchanges to the control exchange have various lengths for various tracing stages, see also Fig. 21, which shows such various impulse lengths and their resulting relay functions which will be described below. The longest of the impulse lengths, *t1*, is thus used for advancing the relays which connect all the metal strips belonging to a complete holding magnet unit in the crossbar switch in question to the amplifier during the tracing procedure. Somewhat shorter impulses, with the impulse length *t2*, are used to trace the individual metal strips of the said crossbar switch. Still shorter impulses, with the impulse length *t3*, are transferred from the minor exchange in question to the control exchange when the tracing is carried out by means of direct contact, that is when also the selecting magnets take part in the operation.

In this way characteristic impulses are obtained at the controlling exchange when the relays are advanced for the tracing of the holding magnet units, of the metal strips and of the individual contacts. As will be shown below an effective checking for possible faults in the impulse transmission is hereby obtained.

Figure 24:
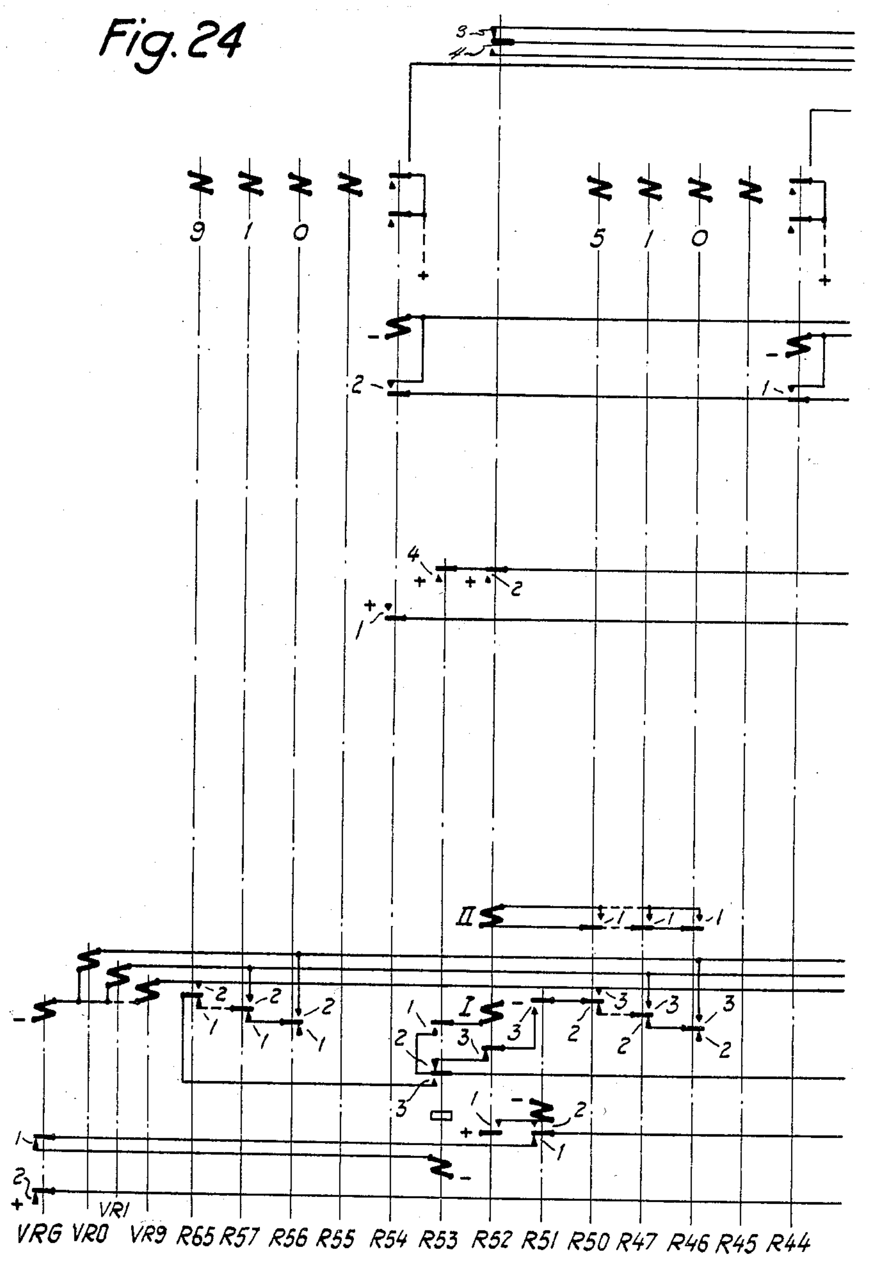
Figures 24–29 are to be matched to each other.
Figure 25:
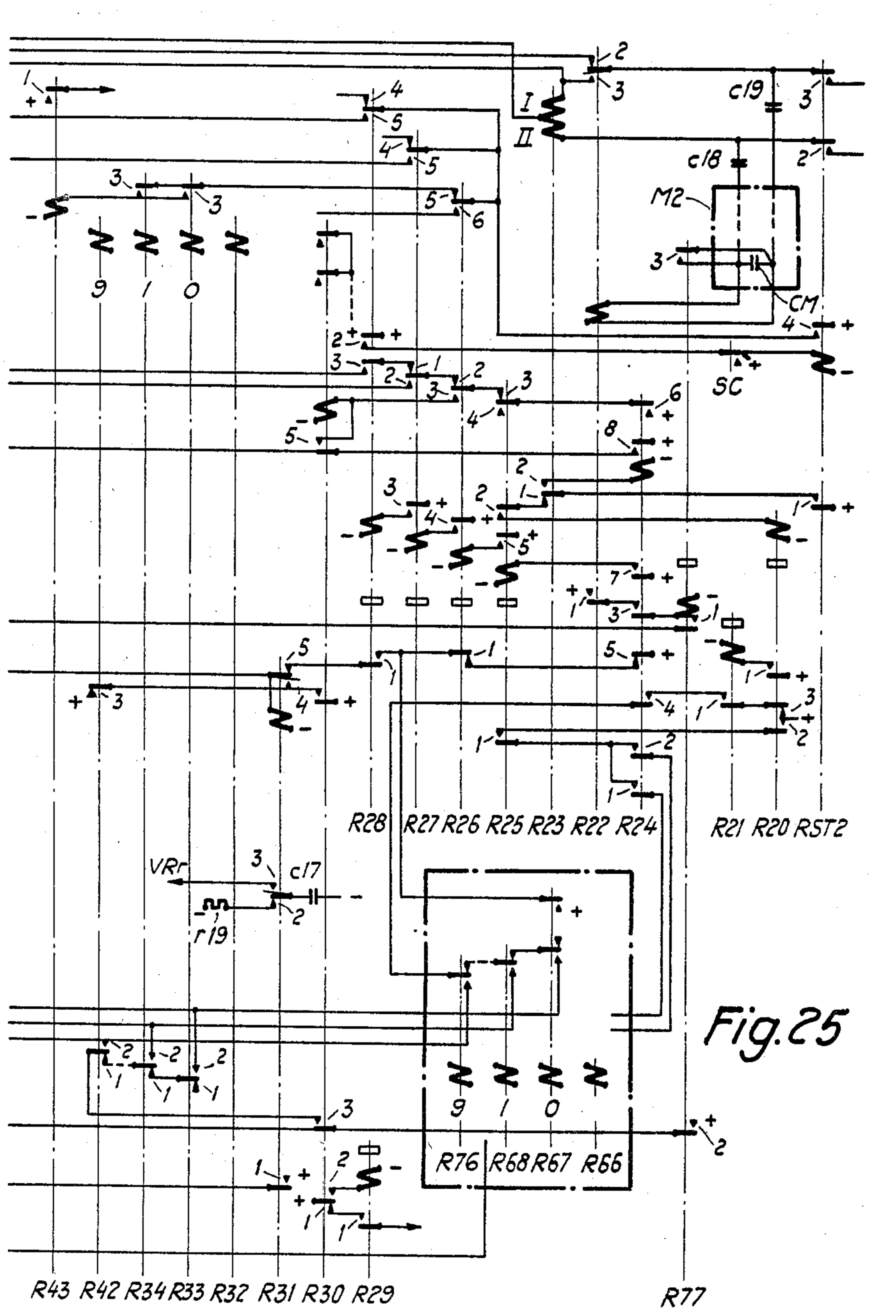

The devices which are shown in Figures 24–25 consist of the relays R31–R42 for indication of short impulses of the length *t3*, received during the individual contact tracing by means of the cross-bar switch. Relays R44–R50 indicate pulses of the length *t2*, received while tracing on the metal strips. The relays R54–R65 indicate impulses of the length *t1*, received while tracing on the holding magnet unit groups.

The relays R24–R28 separate the impulses with respect to their lengths and have for this reason different release periods. Relay R20 has a release period that is somewhat longer than the release period of relay R24, so that it operates in pace with impulses of the shortest length although with somewhat delayed action. Relay R22 is connected to the amplifier for the reception of the tracing tone, which relay indicates when a connection carrying tracing tone has been found. Relay R23 is a relay for the reception of all the impulses from the respective minor exchanges. Relay RST2 is a connecting relay for a minor exchange.

Figure 26:
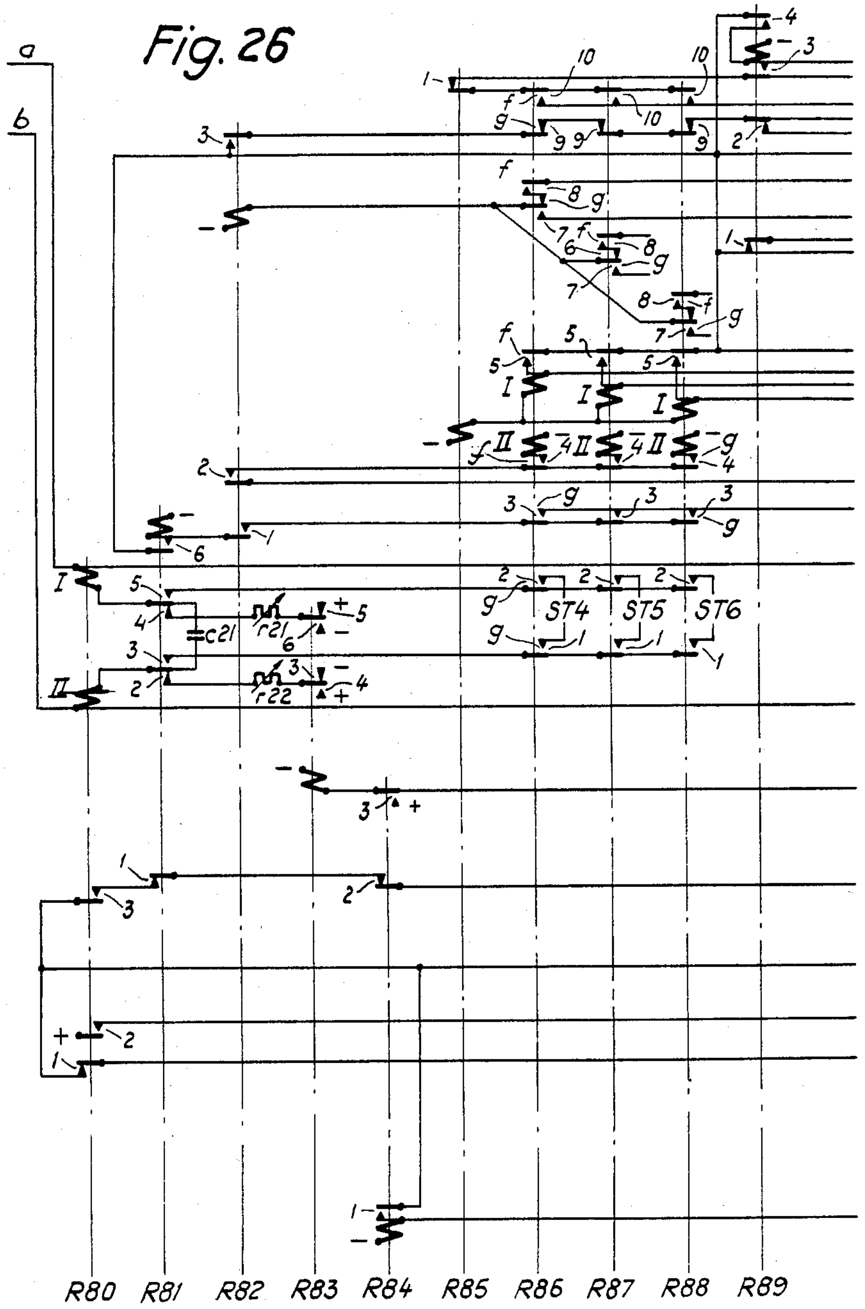
Figure 27:
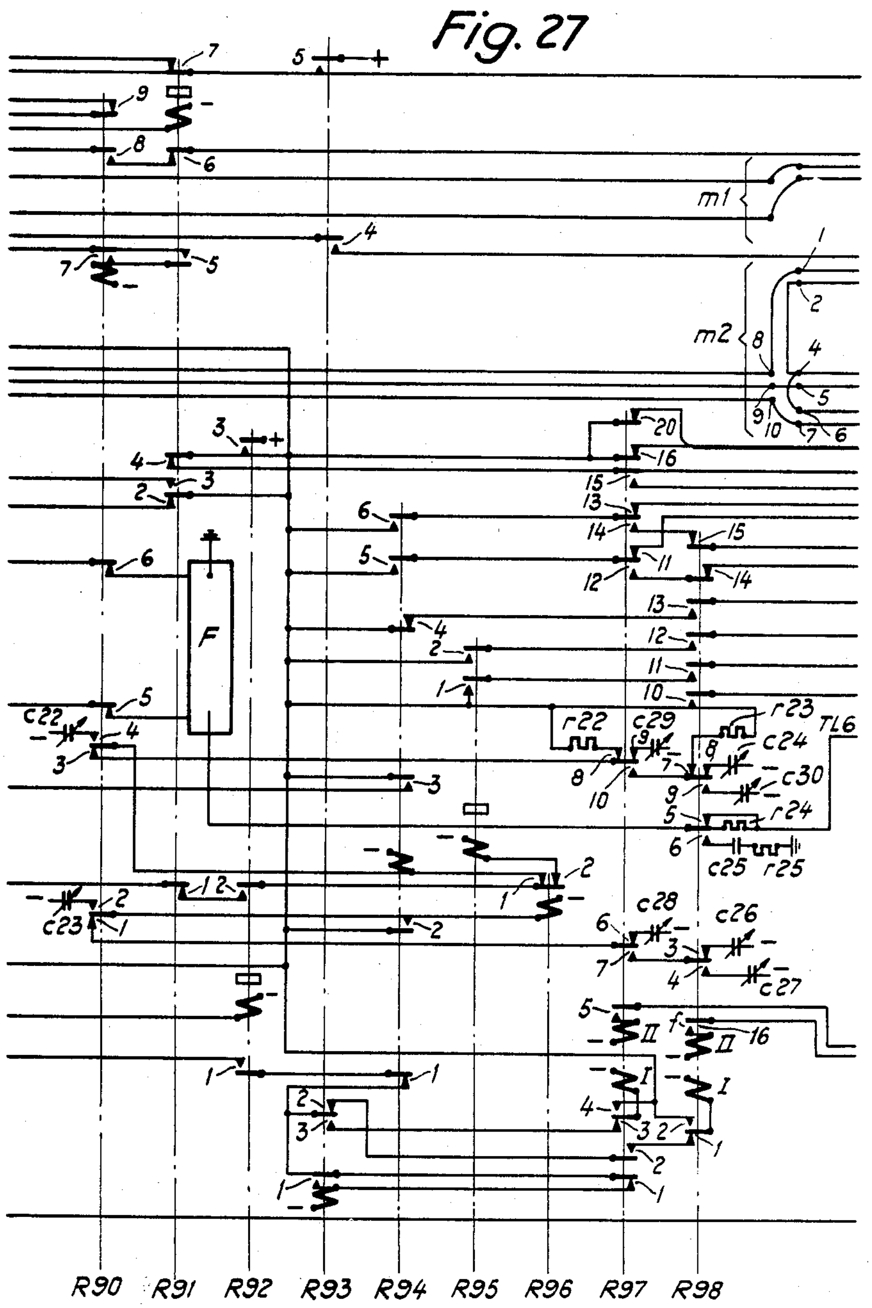
Figure 28:
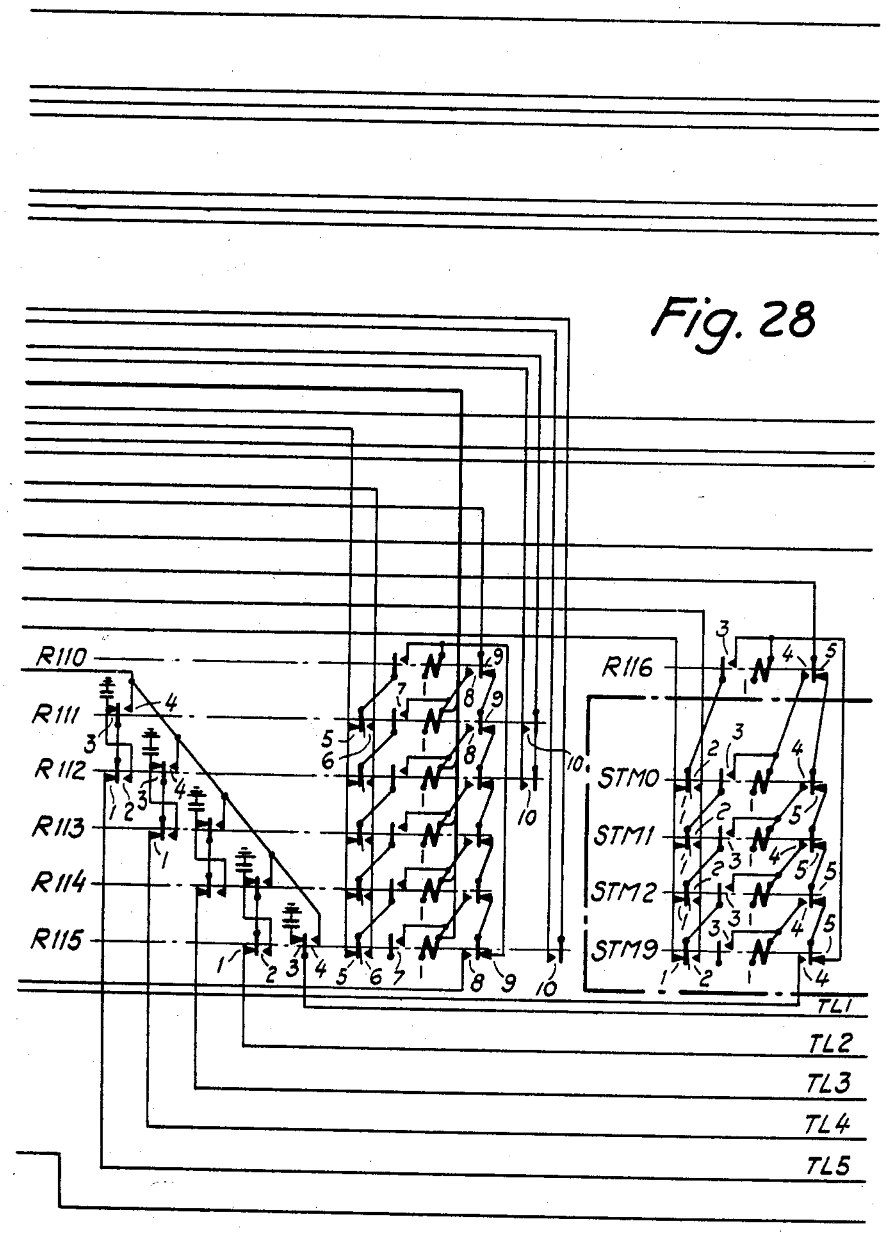
Figure 29:
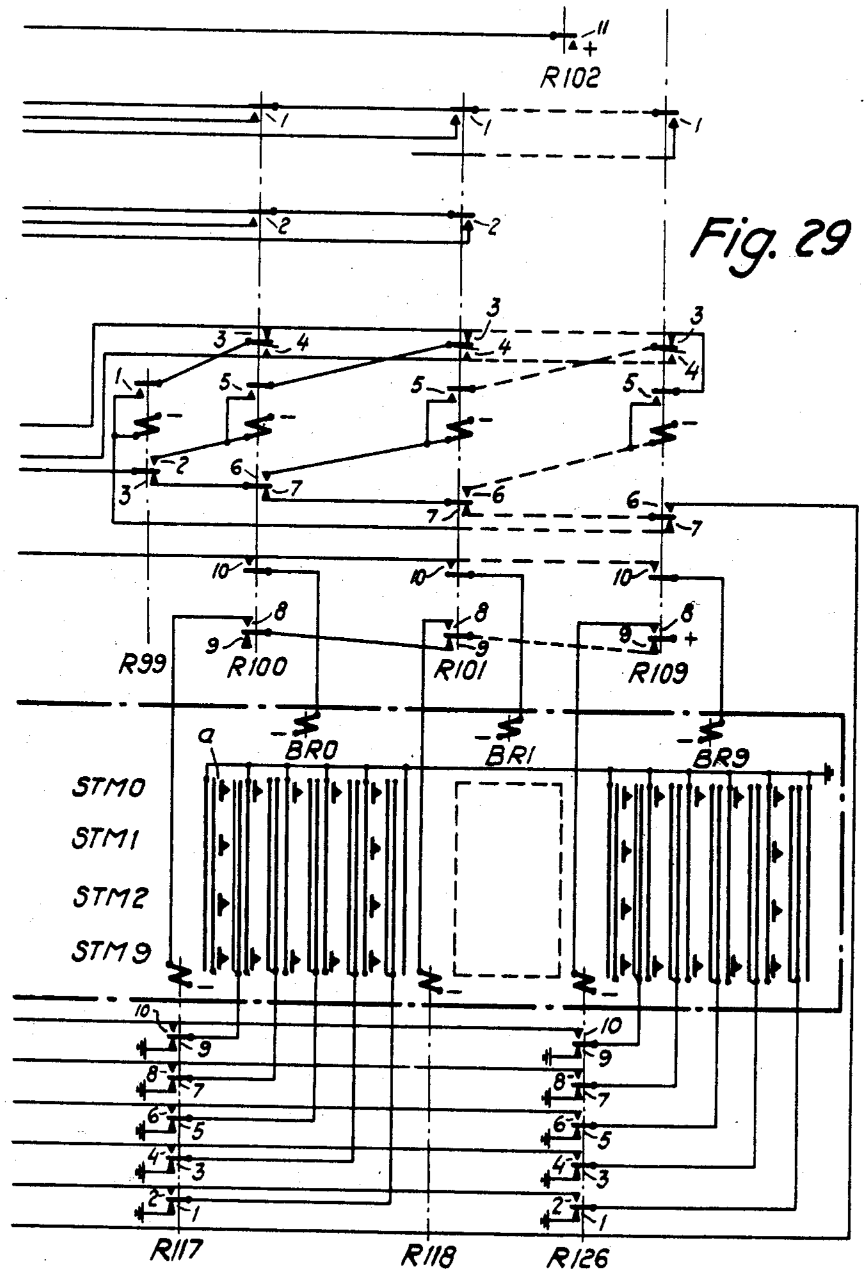

The type arms of the typewriter are in known manner operated by magnets which are marked VR0, VR1 . . . VR9 and VR*r*, the first mentioned representing the figures 0–9, and VR*r* being the lineshifting magnet. The other relays in Figures 28–29 are more or less auxiliary relays, except R66–R76. These relays act as receiving relays for short impulses of the length *t4* which are transmitted from the respective minor exchanges and received by the controlling exchange each time the control connection is switched forward to the next exchange. Each minor exchange is provided with an impulse transmitting device which sends impulse series consisting of the said short impulses to the controlling exchange, the number of impulses in the series indicating to which exchange the extension is made, so that an identification of this exchange is obtained. Thus, if the exchange ST3 in Figure 1 extends the control connection to the exchange ST5, certain identification impulses are transmitted which form a predetermined number for the identification of the exchange ST5. If, on the other hand, exchange ST3 extends the control connection to exchange ST4, exchange ST3 will instead transmit the identification impulse series characteristic of ST4. In Figure 26 relays R86–R88 are shown, which relays control the transmission of such identification impulse series. In Figure 26 a receiving relay R80 is further shown for signals transmitted from the control exchange to the minor exchange in question. Relay R83 is an impulse transmitting relay for the transmission of impulses causing reversal of circuit of current from the minor exchange in question to the controlling exchange. Relay R81 is a change-over relay for change-over of the control connection from one exchange to another. Relays R86–R88 here determine to which exchange the change-over is to be made. Relay R82 is a so-called testing relay which tests and interrupts the impulsing when a predetermined number of impulses in an impulse series has been transmitted at the said identification procedure. Relays R94–R96 are impulse relays for the generation of all the impulses. The remaining relays in Figures 26–27 are auxiliary relays.

The relays R99–R109 control the capacitive tracing of the holding magnet units. Relays R117–R126 are auxiliary relays to the last-mentioned relays. Relays R110–R115 connect the various metal strips (S in Figure 14) in the crossbar switch while tracing over the latter. STM0–STM9 are selecting magnets in the crossbar switch and relay R116 is an auxiliary relay of these selecting magnets. The amplifier F in Figure 26 amplifies the identification tone transferred over the capacitive coupling to about zero level. The gain of the amplifier is adjustable with the aid of the contacts of relay R98, so that required reduction of the amplification is obtained while tracing directly on the contacts, as in this case half the identification voltage is transferred to the amplifier, contrary to what happens in the instance of capacitive tracing when only a minor part of the voltage is transferred to the amplifier.

In the following circuit diagram shown in Figures 24–29 it is assumed that the controlling exchange ST1 according to Figure 1 has been connected to exchange ST3 and that the connection has been extended from the exchange ST2 in the manner which will be described below.

As exchange ST1 by means of the control connection is thus connected to exchange ST2 and the connection has from there been extended to exchange ST3, relay RST2 (Figure 25) has operated in the manner which will appear from the following, and so has further a relay at the exchange ST2 which corresponds to relay RST2 at exchange ST1. At the extension of the control connection to exchange ST3 relay R23 (Figure 25) and relay R80 (Figure 26) operate in the following circuit: plus, contact 5–R83, resistance *r*21, contact 4–R81, winding I of relay R80, the *a*-branch, exchange ST2, contact 3–RST2 at exchange ST1, contact 2–R22, contact 3–R52, the low-ohmic winding II of relay R23, contact 2–RST2, the *b*-branch, exchange ST2, winding II of relay R80 at exchange ST3, contact 2–R81, resistance R22, contact 3–R83, minus. Relay R92 operates to current through contact 2–R80. The impulsing is started. Relay R94 operates in the following circuit: plus, contact 3–R92, contact 3–R80, contact 1–R81, contact 2–R84, contact 1–R91, contact 2–R84, contact 1–R91, contact 2–R92, contact 1–R96, the winding of relay R94, minus. Relay R96 operates to current through the contacts 3–R92 and 2–R94. On the operation of R96 the circuit for re'ay R94 is opened at contact 1–R96, so that relay R94 releases and at the contact 2–R94 the circuit is broken for relay R96 which also releases. Thereupon R94 operates again in the above-described circuit and so does R96 which opens the circuit for relay R94 and so on. The relays R94 and R96 thus form an impulse generator as they impulse and transmit current impulses through contacts 3–R94—6–R94. During this impulse transmission the condensers C28 and C29 are connected in parallel with the windings of the relays R96 and R94, respectively. The capacity of these condensers thus determines the release time for the impulse relays. The condenser C28 is hereby connected to relay R96 in the following circuit: Minus, winding of relay R96, contact 1–R90, contact 6–R97, condenser C28, minus. The condenser C29 is a similar way connected to relay R94 over the following circuit: Minus, winding of relay R94, contact 3–R90, contact 9–R97, condenser C29, minus.

On this operation of relay R92 all the relays R111—R115 obtained current through their common contact 3–R92 and their individual contacts 16–R97—20–R97, contacts 4–R111—4–R115 thereupon connecting to a common conductor TL6 all of the conductors TL1–TL5, which are connectable through contacts of relays R117–R126 to the metal strips in the crossbar switch, so that each of conductors TL1–TL5 is connectable to its own predetermined metal strip in each of the holding magnet units BR0—BR9. The conductor TL6 is connected to the input side of the amplifier F in Figure 27.

The relays R99 to R109 are operated over three wires entering as a group from the left into Figure 29. During the impulsing there is a steady positive potential on the upper wire, while positive impulses appear simultaneously on the two lower wires. For the first positive impulse relay R99 is operated through its own contact 3, and when operating, it interrupts its energizing circuit at this contact 3 while taking instead holding current through its contact 1 from the upper wire via contact 3–R100. Of course contact 1–R99 has to close early enough in relation to the opening of contact 3–R99 to assure that relay R99 really is operated. Immediately after this operation relay R100 is also operated in response to the remainder of the same impulse, which even if it is short, has a sufficient duration to cause the operation of relay R100. The last-mentioned relay immediately obtains holding current from the steady plus potential on the upper wire through contact 5–R100. When the positive impulse on the second wire ceases, relay R99 is released and will not operate again as its energizing circuit is interrupted at contact 7–R100. On the arrival of the positive impulse relay R101 will be operated from the lowest wire, switching the steady holding current for relay R100 over at contacts 3 and 4 to holding current from the middle wire, which current will cease as soon as the impulse ceases so that the relay R100 is released. In this way an optional number of relays can be successively operated, and the basic principle is that a relay causing the operation of a succeeding relay will have its holding current changed over by the succeeding relay from a continuous current supply to current ceasing at the end of the impulse, so that during each impulse there are always two relays in operated position simultaneously. By the step of keeping a relay operating a succeeding relay in operated position until the impulse ceases the operation of the relay set is not critical with regard to the length of the impulses, provided of course that the relays are quick enough to become duly operated by the impulses.

At the beginning of the first impulse, that is when R94 operates for the first time, relay R99 receives current in the following circuit: Plus, contact 3–R92, contact 5–R94, contact 11–R97, contact 3–R99, the contacts 7 of relays R100–R109, winding of relay 99, minus. Relay R100 operates in the following circuit: Plus, contact 3–R92, contact 5–R94, contact 11–R97, contact 2–R99, winding of R100, minus. Relay R99 obtains holding current in the following circuit: Plus, contact 3–R92, contact 6–R94, contact 13–R97, contact 4–R100, contact 1–R99, winding of relay R99, minus. Relay R100 obtains holding current for current from contact 3–R92 through its contact 5 and contacts 4–R91 and 3–R101. When the impulse stops, relay R99 releases on account of the fact that its holding current is interrupted at contact 6–R94.

On the operation of relay R100, relay R117 is operated by current through the make-contact 8 of relay R100 and the break-contacts 9 in the relay chain consisting of relays R101–R109, so that relay R117 operates and, at its contacts 2, 4, 6, 8, and 10 connects the conductors TL1–TL5 to the metal strips in the holding magnet unit BR0. When relay R94 operates to the next impulse, relay R101 obtains operating current over the following circuit: Plus, contact 3–R92, contact 5–R94, contact 11–R97, contact 3–R99, contact 6–R100, winding of R101, minus. When the impulse ceases, relay R100 releases on account of its holding circuit through contact 4–R101 being interrupted at contact 6–R94. In the same way, the next impulse will operate R102 which will cause R101 to release at the end of the impulse and so on. Relays R118–R126 will operate successively—in the same way as relay R117—upon the advancing of the relays R101–R109.

At the beginning of the first impulse also relay R83 operated to current from contact 3–R94. The polarity of the line leads are then reversed at contacts 3—5 of relay R83. The condenser C21 (Figure 26) which is connected to the transfer contacts of relay R81 eliminates a considerable part of the disturbances which arise within the frequency band of about 1700 c./s. used for the identification tone, due to the current reversals taking place when relay R83 operates and releases.

When relay R83 releases or operates the current direction is changed through the windings I and II of relay R80, wherefore this relay releases momentarily on these occasions if it is in its operated position. Hereby contact 3–R80 is momentarily opened. The period during which this contact is opened is so short, however, that the operation of the impulsing device is not affected by the same.

Relay R80 may possibly be replaced by a polarized relay provided with a so-called neutral position and combined with an auxiliary relay, connected to the two side-position contacts in such a way that this auxiliary relay operates whether the armature of the polarized relay has been operated in the one direction or in the other. In this instance the contacts on relay R80 shown in the figure are instead arranged on the auxiliary relay. The armature of the polarized relay shall of course move to its middle position when the high-ohmic winding of relay R23 at exchange ST1 is connected. The resistances *r*21 and *r*22 render it possible to adjust the line current, so that it remains substantially unchanged for various line lengths. Relay R23 (Figure 29) which is a current-direction indicating relay, preferably of polarized type, then releases. Relays R24–R28 which operated when relay R23 operated and closed contact 2–R23, will now release in turn. First relay R24 releases on the opening of contact 2–R23. Relay R24 is fast releasing and will therefore release at once. Next relay R25 releases due to contact 7–R24 being broken. Next relay R26 releases due to contact 5–R25 being broken. Finally relay R27 releases because of the breaking of contact 4–R26. The delay periods of the relays R25–R28 at their release are chosen in such a way that the impulse relays in question, R25–R27, release but not relay R28. As has been mentioned already, the last-mentioned relays serve to separate impulses of the various impulse lengths.

At the end of the impulse relay R83 releases again and changes over the original current direction in the line branches whereby also relay R23 operates. Relay R24 operates again because the contact 2–R23 is closed. This causes relay R54 to operate in the following circuit: Plus, contact 6–R24, contact 3–R25, contact 2–R26, contact 1–R27, contact 3–R28, winding of relay R54, minus. Relay R54 obtains only a short current impulse during the operation period of relay R25, because contact 7–R24 opens at the same time as contact 6–R24. Relay R54 is, therefore, dimensioned to operate considerably faster than relay R25 releases. Relay R54 obtains holding current through contact 8–R24 and its own contact 2.

Relay R54 gives an impulse to the relay chain R55–R65, so that the first of these 10 relays, R56 operates. The said relay chain is constructed in exactly the same way as the chain formed by the relays R99–R109, and reference is made to what has been said above about these last-mentioned relays.

When the next impulse is received at exchange ST1, relay R54 releases because contact 8–R24 is broken. At the end of the impulse relay R54 is operated again and advances the relay chain R56–R65 one step. The said procedure will then be repeated also for the third and for following impulses. As appears from what has been said above, relays R56–R65 will advance synchronously with relays R100–R109.

Identification tone is now assumed to have been located at the connection of relay R100, corresponding to the holding magnet unit BR0. As all the relays R111–R115 and relay R117 are in their operated positions, the identification tone is simultaneously transferred to the input side of the amplifier F over the following circuit: Any one of the make-contacts 2, 4, 6, 8, 10 of relay R117, any one of the contacts 4 of relays R111–R115, contact 5–R98, the amplifier F. As the output side of the amplifier F is connected through contacts 5 and 6 of relay R90 to the line from exchange ST1, the tone receiver M2 at the last-mentioned exchange obtains identification tone through the condensers C18 and C19, so that relay R22 is operated, which relay is connected to the output side of the receiver M2. R22 operates R77. As the receiving device M2 (see Figure 13) has a certain time constant due to the previously described device for elimination of the effect of disturbing tones, relay R22 will not be operated immediately, but at about the same time as relay R54. This is due to the fact that relay R54 is operated by an impulse of the length $t1$ (see Figure 21) which is comparatively long.

At the operation of relay R54, relay R31 operated to current through contact 1–R54 and obtained holding current through contact 3–R42 and its own contact 5–R31. Relay R53 operates over the following circuits: Plus, contact 1–R31, contact 1–R51, contact 1–VRG, winding of R53, minus. As will appear from Figure 24, VRG is a relay which is connected in series with all the operating magnets VR0–VR9 of the typewriter, so that relay VRG is operated when any of the magnets of the typewriter are energized by operating current. Relay R52 operates to current over contacts 2–R77 and 1–R53. Relay R51 operates to current from contact 1–R52 and obtains holding current through its own contact 2 and through contact 1–R51. Relay R77 operates in the following circuit: Plus, contact 1–R22, contact 3–R24, winding of relay R77, minus.

Relay R77 obtains holding current through its own contact 1 and contact 2–R52. The operating magnet VR0 of the typewriter now obtains current in the following circuit: Plus, contact 2–R77, contact 3–R53, contacts 1 of relays R57–R65, contact 2 of R56, winding of VR0, winding of VRG, minus. When relay VRG operates and breaks its contact 1, relay R53 releases. Next relay R52 releases because contact 1–R53 is broken.

When relay R22 operated the high-ohmic winding I of relay R23 is connected in series with winding II of this relay by means of contact 2–R22 being broken and contact 3–R22 being closed. Hereby the current in the line circuit is so strongly reduced that relay R80 (Figure 26) releases and opens the circuit to the impulse device at its contact 3–R80. At the operation of R77 the receiver circuit in the receiver M is short-circuited by contact 3–R77 during simultaneous short-circuiting of the condenser CM (Figure 13), so that relay R22 releases. Due to the fact that contact 3–R52 is broken and contact 4–R52 is closed the high-ohmic winding I of relay R23 remains connected in the line circuit until relay R53 has released, whereupon the low-ohmic winding of R25 is connected by contact 3–R52 when relay R52 releases according to what has been said above. In this way a continued impulsing is prevented at the minor exchange until register recording has been made, because relay R80 cannot operate and close its contact 3 until the low-ohmic winding of relay R23 has been connected.

When relay R80 released because of the insertion of the high-ohmic winding of relay R23, relay R93 obtained current and operated in the following circuit: Plus, contact 3–R92, contact 1–R80, contact 1–R94, contact 1–R97, winding of relay R93, minus. Relay R97 operates next over the following circuit: Plus, contact 3–R92, contact 1–R80, contact 1–R92, contact 1–R94, contact 3–R93, contact 3–R97, winding I of relay R97, minus. By the operation of relay R97 the impulsing device is caused to be connected to relays R111–R115 for tracing on one metal strip (S, Figure 14) at a time. On the operation of relay R97 its contacts 16–20 were broken, so that the last-mentioned relays R111–R115 released.

Relay R97 also changes the impulse pace of the impulsing by connecting to relays R96 and R94 by means of the contacts 7–R97 and 10–R97 the condensers C26 and C24, respectively, so that the somewhat shorter impulses of the length $t2$ are obtained.

When relay R80 operates in the manner described above and closes its contact 3, the impulsing is renewed, that is relay R94 operates whereupon relay R110 operates over the following circuit: Plus, contacts 3–R92, 5–R94, contact 12–R97, contact 14–R98, contact 9–R110, contacts 9 of all the relays R111–R115, winding of relay R110, minus. The relays R110 and R115 will then impulse in exactly the same way as has already been described in connection with relays R99–R109, and reference is made to what has been said above about the last-mentioned relays. After the end of the first impulse, relay R111 is thus operated and after the end of the second impulse the relay R112 is operated and so on.

In the same way as when the relays R100–R109 were advanced impulses now are transmitted to the exchange ST1 by means of the relay R83 operating synchronously with relay R94. The length of the impulses of the $t2$ type is such, however, that only the relays R25 and R26 at exchange ST1 release but not the relay R27. When, therefore, the impulse ceases and relay R24 operates, relay R44 obtains current over the following circuit: Plus, contact 6–R24, contact 3–R25, contact 2–R26, contact 2–R27, winding of relay R44, minus. Hereby the relays R45–R50 obtain an impulse and are advanced one step, analogously with what has already been described in connection with the relays R55–R65. In other words, the relays R46–R50 will operate synchronously with the relays R111–R115 at the exchange ST3.

It is assumed that the identifying tone is transmitted over one of the metal strips, for example strip 2, so that tone is fed to the amplifier F when relay R112 is in its operated position, over the following circuit: Contact *a* in the multiple of the crossbar switch, any one of the contacts 2, 4, 6, 8, 10 of relay R117, contact 1–R113, contact 4–R112, contact 5–R98, the amplifier F. In the above described manner relay R22 at exchange ST1 will after a certain delay operate and connect the high-ohmic winding of relay R23, so that relay R80 of exchange ST3 releases and stops the impulsing temporarily. At the operation of relay R22 also relay R77 operates in the described manner. When this occurs the typewriter magnet VR1 obtains current in the following circuit: Plus, contact 2–R77, contact 2–R53, contact 3–R52, contact 3–R51, the contacts 2 of the relays R48–R50, contact 3–R47, the winding of the magnet VR1, the winding of relay VRG, minus.

At the beginning of the next impulse relay R44 releases because contact 8–R24 is broken. The numerals 0 and 1 have now been recorded on the typewriter, stating that the identification tone has been located in the holding magnet unit BR0 in the crossbar switch and in the metal strip 1 of this holding magnet unit.

When relay R80 released, relay R98 obtained current and operated in the following circuit: Plus, contact 3–R92, contact 1–R80, contact 1–R92, contact 1–R94, contact 2–R93, contact 2–R97, contact 1–R98, winding I of relay R98, minus. Relay R93 had released when contact 1–R97 was broken. (The holding circuit of relay R93 through its own contact 1 was opened at contact 1–R80 upon the operation of relay R80.) Relay R98 as previously R97 obtains holding current through their respective make-contacts 2 and 4.

When relay R98 operates the impulsing circuit is switched over from the relays R111–R115 to the individual contact testing. Relay R98 also switches over the impulse contact for the impulsing relays by connecting the condenser C27 through contact 4–R98 to the winding of relay R96 and the condenser C30 to the winding of relay R94 through contact 9–R98. Further relay R98 reduces the amplification of the amplifier F by connecting a potentiometer consisting of the resistance R24 and the condenser C25, connected in series with the resistance R25. The condenser C25 prevents a direct current circuit from being formed through the multiple contacts to the *a*-conductors of the communication lines, so that holding circuits of the current-feeding relays included in these lines cannot be affected.

When relay R80 operates in the above described manner and closes its contact 3 so that the impulsing can start, relay R116 obtains current in the following circuit: Plus, contact 3–R92, contact 2–R95, contact 12–R98, contact 5–R116, the contacts 5 of all the selecting magnets STM0–STM9, the winding of relay R116, minus.

During impulsing on the selecting magnets and connection of the direct contacts also the impulse relay R95 will be used. Relay R95 receives current through contact 2–R96 at the same time as relay R94 obtains current through contact 1–R96, but relay R95 has a considerably shorted delayed action period for releasing than relay R94. Relay R95 gives a short impulse and advances the selecting magnet one step. During the period relay R94 is operated, the circuit for the holding magnet unit is opened at contact 4–R94, so that the holding magnet BR0 is released at this time. When relay R94 releases again, so that the said circuit is closed once more, the period which has elapsed since the said holding magnet released, is sufficiently long to ensure the damping out of the consequent oscillating movements of the selecting fingers of the selecting bars, so that only the desired contacts in the crossbar switch are closed on the following holding magnet operation.

Relay R116 obtains holding current through its contact 3 and the contacts 2–STM0, 11–R98, 1–R95, 3–R92. The selecting magnet STM0 has operated in the following circuit: Plus, contact 3–R92, contacts 2–R95, 12–R93, 4–R116, winding STM0, minus. STM0 obtains holding current in the following circuit: Plus, contact 3–R92, contact 10–R98, contact 1–STM1, contact 3–STM0, winding of STM0, minus. The holding magnet BR0 operates when relay R94 releases in the following circuit: contacts 3–R92, 4–R94, 13–R98, 10–R100, winding of BR0, minus. Hereby the contacts in the multiple of the crossbar switch corresponding to the selecting magnet STM0 are closed.

At the beginning of the next impulse the selecting magnet STM1 will receive a current impulse at the same time as the holding magnet BR0 releases again, whereupon the holding magnet operates again, and so on. In this way the selecting magnet will be advanced by impulses, step by step, in the same way as the relays R100–R109 were advanced previously, as has been described above. Similarly the impulses of the impulse length *t3* will be transmitted to the exchange ST1 in the manner which has already been described for the impulses of the respective lengths *t1* and *t2*.

The impulses for advancing the selecting magnets are comparatively short, as has been mentioned already, so that only relay R23 but not R26 at the exchange ST1 releases. When therefore, relay R24 operates at the end of an impulse, relay R30 operates in the following circuit: Plus, contact 6–R24, contact 3–R25, contact 3–R26, the winding of relay R30, minus. Relay R30 obtains holding current from contact 8–R24 and through its own contact 5. When relay R30 operates, the relays R32–R42 receive an impulse and advance one step. At the next impulse they advance still another step and so on in the same way as has been described already for the relays R56–R65. On the operation of relay R30, also relay R29 receives current through contact 2–R30, operates and remains in its operated position during the whole impulse series because it has delayed release.

It is now assumed that the identification tone is supplied from one of the contacts, for example number three, when the selecting magnet STM2 is in its operated position, so that tone is fed to the amplifier F and relay R22 at exchange ST1 operates. When this has happened the high-ohmic winding of relay R23 will be inserted in the circuit of the control connection in the above-described manner. Also relay R77 operates in the previously described way. Hereupon the typewriter magnet VR2 obtains current in the following circuit: Plus contact 2–R77, contact 3–R30, contacts 1 of the relays R36–R42, contact 2–R35, the winding of VR2, the winding of VRG, minus. Relay R29 releases with delayed action and a sign, for example a hyphen, is typed by the typewriter due to the formation of the following circuit: Plus, contact 1–R30, contact 1–R29, winding of the respective typewriter magnet, minus.

At the operation of relay R77 the receiver M2 is operated in the already described manner, so that relay R22 releases, whereby relay R80 (Figure 26) operates again, so that the advancing of the selecting magnet continues.

Let it now be assumed that identification tone is transmitted through still another multiple contact of the crossbar swich, for example number five of the contacts belonging to the said metal strip. As a result, the advancing of the relays R33–R42 will continue, so that, at the operation of relay R77, when the fifth contact belonging to the strip in question in the crossbar switch is found, a circuit is once more formed for the typewriter magnet VR4 which is operated. This circuit is formed analogously with what has been described for the typewriter magnet VR2. The hyphens obtained on the typewriter by the release of relay R29 thus forms an indication that several tone-carrying contacts belonging the same metal strip have been found.

It is now assumed that there is no identification tone present on any other contact belonging to the said strip in the crossbar switch, but that the impulsing proceeds so that the selecting magnet STM9 is operated. Hereby relay R98 obtains current through winding II: Plus, contact 3–R92, contact 2–R95, contact 12–R98, contact 5–R116, all the break-contacts 5 of the selecting magnets STM0–STM8, contact 4–STM9, contact 16–R98, winding II–R98, minus. The winding II of relay R98 counteracts winding I and as a result relay R98 releases.

When the selecting magnet STM9 has operated, that is when relay R42 also has operated, so that its contact 3–R42 has been opened, and when furthermore relay R30 has released and broken its contact 4, relay R31 loosens its holding current and releases. In other words, this happens when the impulse from exchange ST3, which causes relay R42 to operate, ceases. Relay R51 releases because its holding circuit is opened at contact 1–R31. Further the condenser C17 is discharged through the resistance R19 and contact 2–K31.

As relay R97 remains in its operated position, while relay R98 is now released impulsing with an impulse length of $t2$ will start again. As a result of this impulsing the relays R111–R115 are advanced, whereby tracing is obtained stating whether identification tone occurs on still another metal strip in the crossbar switch of the holding magnet unit group in question.

When the first impulse which continues the advancing of relays R111–R115, is received at the exchange ST1, so that relay R24 will release again, relay R31 obtains current in the following circuit: Plus, contact 5–R24, contact 1–R26, contact 1–R28, contact 5–R31, the winding of R31, minus. Relay R31 obtains holding current through its own contact 5 as has already been described. The typewriter magnet VR3 operates for charging current from the condenser C17 through contact 3–R31. This typewriter magnet causes the changeover to a new line on the typewriter. Relay R53 operates to current through contacts 1–R31 and 1–VRG. It is now assumed that tone occurs on metal strip 4.

At the renewed operation of relay R77 when tone has been received, the typewriter magnet VR0 is again operated over the following circuit: Plus, contact 2–R77, contact 3–R53, the contacts 1 of relays R57–R65, contact 2–R56, the winding of VR0, the winding of VRG, minus. On this new typewriter line the number of the holding magnet in question has thus been repeated. At the same line as the said typewriter magnet is energized, also relay R52 obtains current and operates in the following circuit: Plus, contact 2–R77, contact 1–R53, the winding I of R52, minus. When VRG obtained current and operated, the circuit of relay D53 was opened at contact 1–VRG, so that relay R53 was then released. When thereupon relay D52 releases with delayed action because contact 1–R53 is broken, the typewriter magnet VR3 is energized in the following circuit: Plus, contact 2–R77, contact 2–R53, contact 3–R52, contact 3–R51, contact 2–R50, contact 3–R49, the winding of VR3, the winding of VRG, minus. The strip number is thus printed. Because relay R49 is operated and its contact 1 is closed, the relay R52 is rendered slow in release as its winding II is short-circuited through the said contact. The length of this delay is so chosen, that the typewriter will with certainty obtain current for a sufficiently long time to operate. During these two printing operations of the typewriter, relay R77 has obtained holding current in the following circuit: Plus, contact 4–R53 and 2–R52 connected in parallel, contact 1–R77, the winding of R77, minus. The continued impulsing at the exchange ST3 is delayed by means of the contacts 3 and 4 of relay R52 during the time needed for the said operation of the typewriter magnets, on account of the fact that the high-ohmic winding of relay R23 is inserted to the line circuit.

The identification of the actual tone carrying contact or contacts in this strip then proceeds as before by the stepping of the magnets STM; after which the relay chain R111–R115 is again stepped so that R115 is now operative. The metal strip corresponding to this relay is now assumed to have no indicating tone, wherefore no additional writing is obtained on the typewriter at present. When relay R115 operates, the winding II of relay R97 obtains current in the following circuit: Plus, contact 3–R92, contact 5–R94, contact 12–R97, contact 14–R98, contact 9–R110, the contacts 9 of relays R111–R114, contact 8–R115, contact 5–R97, the winding of R97, minus. As the winding II of R97 counteracts its winding I, the relay releases. This results in a renewed connection of the condensers to the impulsing device, which determines the impulse length $t1$, and reconnection of the impulsing device now is made to the relays R100–R109. The impulse which caused the release of relay R97 will therefore also operate relay R101 and identification is obtained if tone occurs on any multiple contact forming part of the holding magnet unit BR1 by relay R118 being operated in the following circuit: Plus, contacts 9–R109, 8–R101, the winding of R118, minus.

If identification tone should exist on any contact of the holding magnet unit, the number of the said unit is typed in the manner described above, and identification is then carried out on the metal strips, the sign for the tone carrying strip being also typed in the described manner when found. Next follows identification of tone-carrying contacts and the typing of their numbers in the manner which has also been described above.

If, on the other hand, tone should not exist on any of the other holding magnet contacts, the relays R100–R109 are advanced synchronously with the relays R56–R65 until relay R109 and relay R65 are operated, whereby relay R84 operates in the following circuit: Plus, contact 3–R92, contact 5–R94, contact 11–R97, contact 3–R99, contact 7 of all the relays R100–R108, contact 6–R109, the winding of R84, minus. Relay R84 obtains holding current through its own contact 1. The impulsing is interrupted by the circuit of the impulse relays being opened by contact 2–R84.

It may be mentioned that it is particularly advantageous to place relays R117–R126 as close to the holding magnet units BR0–BR9 as possible, adjacent to the ends of the metal strips, so that the conductors between the said metal strips and the said contacts become as short as possible. The reason for this is that all the conductors between the metal strips of the holding magnet units and the amplifier F have to be screened to prevent disturbances from arising. By arranging for these screened conductors to be as short as possible the voltage losses for the signals fed to the amplifier will be kept as low as possible. For the same reason relays R111–R115 should also be placed as close to the first-mentioned relays as possible, so that also the conductors TL1–TL5 are short.

In the immediately preceding part of the specification it has been described in which way one or more tone-carrying connections generally can be identified by means of tracing on gradually reduced groups and the final identification obtained by means of individual testing at the connection points. Identification in said order may for example be used when tracing on the connecting members within one and the same exchange, the incoming lines from the foregoing exchange being associated to the one or those of the crossbar switch holding magnet units which lie first in the chain, and the connection lines to the subsequent selector stages of the exchange being associated in order to the subsequent holding magnet unit or units. If connections also go out from this exchange to one or several associated exchanges, these connections should however be connected to the holding magnet units which in the chain lie next to the holding magnet unit or units for the incoming lines, i. e. before the holding magnet unit or units for the internal connection lines of the exchange.

When connection is made to another subordinate exchange and the selecting device there is started to find the identification tone within the said subordinate exchange, the tracing should preferably take place in the following order: First it is investigated whether identification tone occurs on the communication paths arriving from the immediately preceding exchange to the said subordinate exchange, and then it is investigated whether the identification tone exists on the connection paths going out from the subordinated exchange. For this purpose, coupling points of connecting members, such as incoming telephone lines, of the connections from the immediately preceding exchange, which connections according to the foregoing are associated with the controlling exchange, are connected to the group of contacts belonging to the first holding magnet unit starting with the group associated with the first metal strip in the crossbar switch.

If no connection carrying the identification tone should be found at the said coupling points, there is apparently an interruption somewhere on the connection between the major exchange and the said subordinated exchange. This will cause the tracing, carried out by the crossbar switch of the subordinated exchange in question, to continue to the last holding magnet, whereupon, in a manner already described, relay R84 operates and stops the tracing. Relay R84 operates relay R83 by current through contact 3–R84, whereupon a current reversal signal is transmitted to the control exchange ST1, so that relay R23 at this exchange releases. When relay R23 has been in its released position for a sufficiently long period, relay R28 releases, wherupon the holding current circuit for relay RST2, which had operated at the starting of the device for example by a momentary operation of switch SC, is broken at contact 2–R28, so that relay RST2 releases.

At the release of relay RST2 also the other relays at the last-mentioned exchange loose their holding current and release. When relay RST2 releases, the relays 80 at all the exchanges are deenergized and release, whereupon relay R92 releases due to contact 2–R80 being broken. Relay R92 releases with delayed action and, as a result, all the operated relays at the minor exchange ST3 release.

If, on the other hand, tone should exist in any of the connections which go out from exchange ST3, the crossbar switch continues its tracing procedure in the manner already described, and at exchange ST1 indication is obtained of which connections to other exchanges carry identification tone. This is in the described manner typed by the typewriter. Also relays R86–R88 are operated, however, such a relay being allotted to each outgoing exchange. Thus relay R86 is allotted to the connections to exchange ST4, and operates if identification tone should be transmitted to the said exchange. In the same way relay R87 is allotted the connections to exchange ST5 and R88 to the connections to a possible subsequent exchange.

It may be assumed that the connection is transmitted to exchange RST4 and that coupling points belonging to these connections are connected to the holding magnet unit BR0. When identification tone has been found and relay R93 is operated in the manner already described above, relay R86 is energized through winding I in the following circuit: Plus, contact 3–R92, contact 1–R89, contact 4–R93, contact 2–R100, the terminals 1 and 8 of the intermediate distribution frame M2, the winding I of relay R86, the winding of R85, minus. Relays R–86–R88 are of the so-called two-step type, so that relay R86 only actuates its f-contacts to said current through winding I. The arrangement is carried out in such a way that all traffic routes going out from an exchange are traced before changing over to the next exchange takes place in order to make sure that double setting of a selector had not occurred. In the embodiment the lines of outgoing traffic routes are connected to the holding magnet units BR0 and BR1, while the succeeding vertical units are connected to the own switching members belonging to the exchange at present under consideration. The switching over to succeeding exchange is for this reason controlled in the way described below by a make contact 11–R102, which is operated when the tracing in the two vertical magnet units BR0 and BR1 on all the outgoing traffic routes have been concluded. Relay R91 operates to current through the circuit: Plus, contact 11–R102, contact 1–R85, contact 10–R86, contact 9–R90, contact 2–R89, winding of R91, minus. Due to the fact that contact 4–R91 is broken, all the operated control relays for the crossbar switch are released. (Relay R91 operates faster than relay R89). Relay R90 operates to current through contact 5–R91 and obtains holding current through its contact 7. As a result the circuit for relay R91 is opened and relay R91 releases. Relay R90 connects the condensers C22 and C23 to the impulse relays R94 and R96, respectively, whereby the said relays impulse with the particularly short impulse length $t4$ As has been mentioned already, two impulse series of this particularly short length $t4$ are to be transmitted to the control exchange for identification of exchange ST4. At the release of relay R91, when this relay closes its contact 1, the impulse relays R94 and R96 will impulse synchronously with the impulses of the impulse length $t4$, whereby relays R100–R109 advance at the same time as relay R83 sends current reversal signals to exchange ST1 in the manner already described.

When a predetermined number of impulses have been transmitted in the said manner, relay R82 operates to current through circuit: Plus, contact 3–R92, contact 8–R90, contact 6–R91, contact 1–R100, contact 8–R86, contact 6–R86, the winding of R82, minus. Relay R91 operates immediately for current through the following circuit: Plus, contact 3–R92, contact 3–R82, contact 9–R86, contact 9–R87, contact 9–R88, contact 2–R89, the winding of R91, minus. Relay R91 interrupts the impulsing and causes the operated control relays for the crossbar switch to release in the above described manner. Relay R82 increases the magnetizing of relay R86 by connecting current to its winding II over the following circuit: Plus, contact 3–R92, contact 3–R91, contact 2–R82, contact 4–R86, the winding of 2–R86, minus. As a result relay R86 operates to its position $g$, and as this position opens the circuit for relay R91 at the contact 9–R86, this relay R91 is again released with delayed action. As a result of the release of relay R91, the impulsing starts again with the impulse length $t4$. When a predetermined number of impulses have been transmitted, relay R82 operates again to current through the circuit: Plus, contact 3–R92, contact 8–R90, contact 6–R91, contact 1–R101, contact 7–R86, the winding of R82, minus. The number of impulses in the now transmitted two impulse series for the identification of the exchange have thus been determined by the intermediate distribution frame $m1$.

The change-over relay R81 for extending the control connection to the next subordinate exchange ST4 now operates to current through the following circuit: Plus, contact 3–R92, contact 2–R91, contact 3–R86, contact 1–R82, the winding of R81, minus. Relay R81 obtains holding current through its contact 6. Due to the fact that the contacts 3 and 5 of relay R81 are closed and that the contacts 1 and 2 of relay R86 also are closed, the control connection has been connected to exchange ST4. The procedure described above in connection with the Figures 26–29 relating to exchange ST3, will now be repeated at the exchange ST4.

When the first impulse series with impulses of the length $t4$ were transmitted to the control exchange ST1 and operates relay R24 synchronously with these impulses, relay R25 remained in operated position during the whole impulse series due to slow-action. Relay R20 operated at the first impulse in the manner already described, whereby relays R66–R76 were operated step-by-step through contact 2–R20, contact 1–R25 and the contacts 1 and 2 of relay R24. At the end of the impulse series when relay R20 released, the typewriter magnet VR0 was operated in the following circuit: Plus, contact 3–R20, contact 1–R21, contact 4–R24, contacts 1 of relays R68–R76, contact 2–R67, the winding of VR0, the winding of VRG, minus. As the holding circuit of relays R67–R76 passes through the break contact 2 of relay VRG, relays R67–R76 will release when this relay is operated.

The second impulse series for the identification of the exchange, which series consisted of two impulses, is recorded in a similar way as the first impulse series and operates the typewriter magnet VR1, and this procedure will therefore require no detailed description.

It will appear from what has been said above that if relays R87 or R88 had operated, that is, if the connection is extended to another subordinated exchange, impulse series characteristic for the identification of this other exchange would have been transmitted to exchange ST1, depending on the connection in the intermediate distribution frame $m2$.

If, on the other hand, no tone-carrying connection to any of the subordinate exchanges is found, which means that the connection has entered exchange ST3 but has not passed on from there, none of the relays R86–R88 will operate. Instead the tracing procedure continues within the exchange ST3 in the manner which has already been described.

As has likewise been mentioned above, it is characteristic of the invention that identification is carried out within an exchange also of other connecting members than of incoming and outgoing connection lines, in case a connection has passed in to the exchange but has not passed out from it again, that is when a rupture has arisen in the connection within the exchange. Due to the fact that those connecting members at this exchange which carry the tone, have been recorded by the typewriter at the control exchange, information is obtained about which connecting members have caused the interruption of the connection, or otherwise expressed, about where the fault is located.

If, while tracing the communication paths to the subordinate exchanges, it would appear that identification tone is passing out towards two exchanges, also this means that there is a fault at the subordinate exchange in question (ST3), for example, that double setting has taken place in some selector. In such a case two of the relays R86—R88 would have operated, and relay R85 would have received a current amounting approximately to twice the current strength it would have received, if only one of the relays R86–R88 had supplied it with current. In such a case, the margin adjusted relay R85 will operate and break its contact 1, whereby relay R91 is prevented from operating in spite of the fact that the contacts 10 of two of the relays R86—R88 are closed. In this way the transmission of exchange identification impulse series is prevented and cannot take place to another subordinate exchange. Instead the tracing of the identification tone within the same exchange continues in the same way as if none of the relays R86–R88 had operated.

As has been mentioned above, the exchange identification is started by relay R91 being momentarily operated, which operation causes the operation of relay R90 and the release of the control relays of the crossbar switch. If no tone carrying connection has been found, which would mean that the tracing shall take place within the connecting members of the same exchange, relay R89 will operate in the following circuit: Plus, contact 11–R102, contact 7–R91, the winding of relay R89, minus. This results in the opening of the operating circuit for relay R91 at contact 2–R89. Relay R89 obtains holding current in the following circuit: Plus, contact 3–R92, contact 4–R89, the winding of R89, minus.

It has been described above how the control connection is extended from the subordinate exchange ST3 to exchange ST4 or any other exchange. Analogously extension takes place from exchange ST2 to exchange ST3 and from exchange ST1 to ST2. The exchanges ST1 and ST2 have each a tracing device analogous with the tracing device at exchange ST3.

In the embodiment of the invention according to Figures 24–29 described above, it has been assumed that the required number of points in the crossbar switch for the tracing of the identification tone has not exceeded the number which can be contained within a single crossbar. At comparatively large exchanges, it is not certain, however, that the number of such connection points is sufficient, if only one crossbar switch is used. In such cases a plurality of crossbar switches have to be used, so that the number of connection points can be increased to a required degree.

Particularly, in the case of such an embodiment of the invention the identification of the tone can suitably take place in such a way, that all the strips within an entire crossbar switch are interconnected by means of the relay device, whereupon the identification of whether tone occurs on any multiple contact, is carried out within the whole crossbar switch. If, for example, tone should exist within the first crossbar switch, the tracing of this switch is carried out in the manner described above. If, however, there exists no tone within the first switch, all the metal strips of the next switch are connected and the identification is made within its group of contacts, if tone is found during this procedure, while, if this should not be the case, the metal strips of the next switch are connected, and so on. The impulses which are used for the advancement from one selector to the next should have an impulse length still longer than $t1$, so that they can be separated by means of an additional relay with delayed action, operating according to the same principle as the relays R25–R28, which additional relay is placed at exchange ST1. The counting of these long impulses will then be made by means of still another relay set, similar for example to the relays R56–R65. Also this relay set is connected to the operating magnets of the typewriter in substantially the same way as the relays R56–R65. When a new line is begun on the typewriter, there should in addition to the setting of the relay set R56–R65 also be registered again the setting of the said additional relay set. This is made by modifying the function of the relays R51–R53, so that on the typewriter there is first registered the setting of the additional relay set and next the setting of the relays R56–R65 in the manner which has already been described.

At the transmission of the exchange identification impulses from the subordinated exchange to the control exchange, the usual type of impulsing is used according to what has been said above, that is impulsing with break impulses. It is obvious that this impulsing can be made according to the principle of half-period impulsing in the manner described in connection with Figures 15–20. It will further be understood that any known method for the transmission of signals or measuring data, for example with the aid of two-frequency, five-frequency or a periodic current impulse transmission, can be used for controlling and recording signals between the various exchanges. Signalling can also be made with the aid of tone signals, and no special control connection is then required, but the tone signals can be transferred over the normal communication lines in a required number of channels (compare tone-telegraphy channels).

As has been mentioned earlier in this specification, an effective control of the impulse transmission is obtained by the use of various impulses for various stages of the tracing procedure. If, for example, with impulsing of length $t3$ having already started so that the chain R33–R41 is partially set, an impulse of the impulse length $t2$ is received at the controlling exchange before ten impulses of length $t3$ have been received, that is before relay R42 has operated, some fault in the impulsing has, of course, taken place. This fault can be indicated at the controlling station by the operation of a relay R43, which obtains current in the following circuit: Plus, contact 4–RST2, contact 5–R26, a contact of any of the relays R33–R41, the winding of R43, minus. It is then presumed that relay R42 is connected in such a way to relay R33 that, if more than 10 impulses are obtained over this relay chain, relay R33 will operate at the 11th impulse, relay 34 at the 12th impulse and so on. In this way indication is also obtained in case more than ten impulses of the same length are received. Through a contact of relay R43, the desired fault alarm signal can be obtained. In an analogous way, observation of other impulses of other impulse lengths are also obtained. By means of a further extension of the separating relays R25–R28 by including a slow-releasing relay, abnormally long impulses can be indicated. It should be observed, however, that a very long impulse having for example an impulse length of a second, will cause the release of all the separating relays R25–R28 and the disconnection of the device in the above-mentioned manner.

In the above described device with impulse transmission by means of impulses of different, characteristic impulse lengths, it is of course important that the various impulse lengths are maintained with comparatively good accuracy. In the case in which the impulse-transmitting and -receiving members consist of relays such as in the above described embodiments of the invention, or of other members, the operating time of which depends on the prevailing voltage, the voltage may be stabilized in any known manner. Such a stabilization of the voltage may in particular prove to be necessary in the cases where condensers are used as delaying members.

Figure 21:
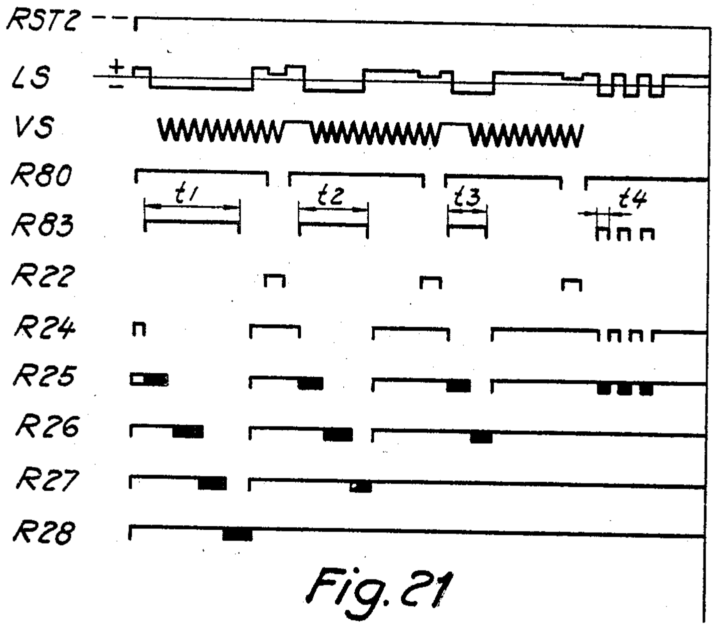
Figure 21 shows a time scheme for the operation of certain relays.
Figure 22:
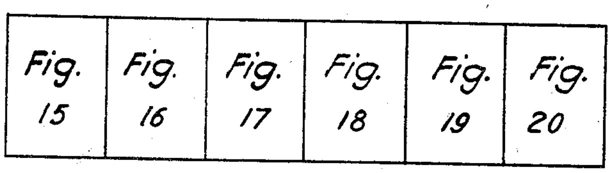
Figure 22 shows how
Figure 23:
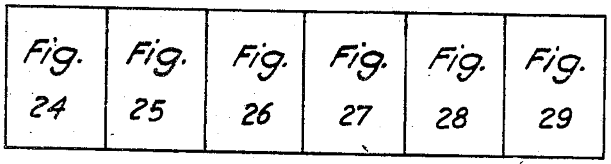
Figure 23 shows how

The relationship between the intensity and direction of the current in the control connection on one hand and the impulses of various impulse lengths and tone signals transmitted over the control connection as well as functions of the corresponding relays on the other hand is illustrated in the time diagram in Figure 21. In this diagram the direct current in the control connection is designated LS and the alternating current of the identification tone as retransmitted over the control connection is designated VS. The designations R83, R22 etc. are intended to indicate that the time diagram of the so marked line refers to a relay with the same number in Figures 25 and 26. As the operating times of the relays are comparatively short, they have not been represented in the time diagram, while the release times have been indicated by thick lines. In the described embodiment of the invention, one millimeter represents about 10 milli-seconds.

In instances where the control connection is long or contains members with a comparatively high resistance, such as may be the case when a control connection is extended over a large number of exchanges, which must each have a holding relay R89 inserted in the control connection, impulse or signal repeaters may be connected in a known manner per se at suitable points of the control connection.

When registers are included at any of the subordinate exchanges, an interruption will generally occur in the voice connection during the time when the said register is connected, which means that the identification tone cannot, without special measures, be transmitted during this period. As it is of importance that the identification tone can be transferred also when the register is connected, the register should preferably be provided with devices, such as condensers or filters for interconnection of its output and input sides in such a way that the identification tone is allowed to pass without the normal operation of the register being disturbed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a system having a plurality of communication channels each comprising one or more connections, each of said connections including a plurality of switching elements movable to different positions to correspond to a selected one of said communication channels, a source of electrical tracing voltage, means connecting said source to said communication channel at a first location, an indicator, a scanning device, means coupled to said communication channels at a plurality of predetermined ones of said connections and connected through said scanning device to said indicator to indicate at which elements the voltage from said source occurs thus identifying the elements and connections forming the selected communication channel.

2. The system according to claim 1, wherein the communication channels form part of an automatic telephone system comprising a number of telephone exchanges, said voltage source is an alternating current source, and said indicating instrument is frequency selective and tuned to receive the frequency of said alternating current source whereby the existence of current from the alternating current source is indicated independently of disturbances from telephone conversations existing within the communication channels.

3. The system according to claim 1 further having an amplifier between said scanning device and said indicator and a conductor connected to the amplifier comprising a strip of sheet metal provided with clamping elements adapted to be clamped on the desired connecting wires in the communication channels.

4. The system according to claim 3, wherein the amplifier includes at least one filter section to be frequency selective means for synchronizing and the transmission of the tracing voltage from said source and operation of said scanning device for connecting the amplifier to the means coupled to said communication channels whereby disturbing currents are eliminated.

5. The system according to claim 4, wherein said tracing voltage comprises at least two frequencies and said amplifying and indicating devices are responsive to produce an indication only when both the frequencies have been received.

6. The system according to claim 1 wherein said means coupled to said communication channels comprises the capacitance between contact springs of a crossbar switch and metal strips common to a number of such contact springs, one conductor from each connection being connected to its separate contact spring and the metal strips being connected to said indicator.

7. The system according to claim 6 in which the crossbar switch comprises a plurality of metal strips with said contact springs arranged in layers, wherein the switching members are arranged to connect and disconnect the strips to and from said indicator.

8. The system according to claim 7 further having at least one screen arranged between each two adjacent layers to reduce undesirable coupling between metal strips and contact springs belonging to different layers.

9. The system according to claim 1, wherein the voltage source consists of an alternating current supply and the indicator includes a band pass filter with a comparatively narrow frequency band and with minimum attenuation for the frequency of said alternating current source, an analogous filter with its minimum attenuation to one side of and immediately adjacent to the passed band of said band pass filter, rectifiers and equalizing devices connected to rectify and equalize the currents separately from said filters, and an indicating device which is operated in response to the difference between the rectified and equalized current from the band pass filter and the rectified and equalized current from the analogous filter whereby said indicator operates when said difference exceeds a predetermined value.

10. The system according to claim 9, further having a second analogous filter with a comparatively narrow frequency pass band tuned on the other side of the frequency band passed by the first analogous filter, so that currents from the two filters having their bands on each side of said filter are added and compared with the current from the band pass filter whereby the indicating instrument operates in response to the difference between the sum of the currents from the two analogous filters and the current of the band pass filter.

11. The system according to claim 1 further including amplifiers in said communication channels and having said means coupled to said elements arranged on both sides of the amplifiers, and means connecting currents taken separately from both sides of the amplifiers, to said indicator through frequency selective amplifiers to provide a signal responsive to the ratio of the said separate currents for indicating when the relation between said currents assumes abnormal values.

12. The system according to claim 1, wherein the means coupled to said communication channels comprises a metallic surface close to contact springs in a relay spring group.

13. The system according to claim 12 wherein said contact springs are arranged to provide said capacitive coupling and in addition direct contact with the elements in the communication paths.

14. In a communication system comprising a control station having switching members and one or more substations, an auxiliary source of voltage connected in said system, a plurality of selecting devices located in said substations adapted to be operated for tracing the voltage from said source from said control station to said substations, a control connection between said control station and the substations, and means for transmitting over said control connection synchronization and operation signals for synchronizing and operating switching members in the control station so that the said switching members indicate the setting of the selecting devices in the respective substations.

15. The system according to claim 14 wherein said selecting devices are provided with means controlling the regular advancement of the selecting devices so that advancement from one selecting device to another cannot take place until the advancement within said one selecting device has proceeded a predetermined number of steps and further having means for operating the switching members in the control station which indicate the setting of the selecting devices in synchronism with the selecting devices and means indicating if the regularity of operation is broken.

16. In a communication system comprising a control station, a plurality of substations each having selecting devices, a control connection extending from one substation to another and an auxiliary tracing voltage source connected in said system, indicating means connected to said selecting devices responsive to the setting of the selecting devices at the finding of voltage from said source to indicate the next substation connected in the communication system, and means responsive to said indication to cause the control connection to be extended to said next substation and initiate operation of a recording device for recording identification of said next substation.

17. In switching networks comprising a plurality of switching stages each having a plurality of switches for selectively establishing signal connections through a series of such stages, an arrangement for the tracing of a connection set up by said switches through a plurality of said switching stages from a known point of the connection in the forward direction of the switching course comprising hunting means successively connecting conductors of said switching stages serving as said signal connections to a circuit extending between said known point and the hunting means and including a source of a characteristic tracing voltage, means operating in response to said tracing voltage for indicating the setting of said huntnig means on said conductors carrying said tracing voltage, supervisory equipment, and means for transmitting to said supervisory equipment information identifying the setting of said hunting means as indicated by said means operating in response to said tracing voltage.

18. In switching networks comprising a plurality of switching stages each having a plurality of switches for selectively establishing signal connections through a series of such stages, an arrangement for the tracing of a connection set up by said switches through a plurality of said switching stages from a known point of the connection in the forward direction of the switching course comprising hunting means successively connecting conductors of said switching stages serving as said signal connections to a circuit extending between said known point and the hunting means and including a source of an alternating tracing voltage, means operating in response to said tracing voltage for indicating the setting of said hunting means on said conductors carrying said tracing voltage, supervisory equipment, means for transmitting to said supervisory equipment information identifying the setting of said hunting means as indicated by said means operating in response to said tracing voltage, said hunting means comprising selectively operable contact springs arranged in spaced relation to conducting strips so as to form capacitors, one electrode of which is constituted by a spring and the other electrode by the corresponding conducting strip, the conductors arranged for carrying said tracing voltage being connected to the different contact springs; the terminals of the hunting means for hunting over groups of speech conductors being connected to said conductive strips; and the terminals of the hunting means for hunting over individual speech conductors being formed by said contact springs, which co-operate with countercontact members connectable with the indicating means responsive to the tracing voltage.

19. The switching network as defined in claim 18 wherein the contact springs form part of contact spring layers in a crossbar switch and the conductive strips are metallic layers insulatedly arranged in juxtaposition to the corresponding contact spring layers.

20. An arrangement in a telephone system having a plurality of switching stages for tracing from a known point in one of the stages of said system the route of a connection through a plurality of switching stages comprising lines connectable with said known point for the establishment of a telephone connection and belonging to predetermined groups of lines, said lines having in each of said groups speech conductors each connected through an individual capacitive element to a common point so that said common points representing different line groups are formed in switching stages in the forward direction in the route of connection starting from that stage in which the known point is situated, a characteristice tracing signal voltage source connected to supply a tracing signal voltage between said known point and said common points through a circuit including an indicating device sensitive to said tracing signal voltage and combined with recording means selectively operable to indicate which of said common points form a closed tracing signal voltage circuit extending from said known point, the capacitances of the capacitive elements being chosen such as to prevent undue crosstalk between the different lines having interconnected speech conductors while passing to the respective common points sufficient tracing signal voltage energy to provide reliable operation of said indicating device.

21. The arrangement according to claim 20, further having a hunting selecting means for successively connecting said indicating device in each switching stage to various common points and means transmitting the setting of said hunting selecting means to said recording means.

22. The arrangement according to claim 20 in which each line has a speech conductor connected with a contact spring in a crossbar switch, said contact springs associated with lines belonging to said groups of lines being positioned adjacent to a common strip so as to form with the common strip said capacitive elements, and said strip forming said common points for said group of lines.

23. The arrangement according to claim 22, further having means connecting said indicating device to the common points formed by said strips and also individually to said lines by galvanic contact through said contact springs.

24. The arrangement according to claim 22 wherein said crossbar switch comprises a plurality of layers of contact springs, each layer of contact springs being capacitively coupled to a separate strip so that each spring layer represents a group of lines with a common tracing point, switching members for successively connecting said strips to said indicating device, and means for transmitting the setting of said switching members to said recording means.

25. The arrangement according to claim 20 having indicating devices in a plurality of switching stages, means for rendering the various indicating devices operative successively in response to the operation through an identified signal voltage in a preceding switching stage, and means connecting said recording means to record the operation of the various indicating devices.

26. The arrangement according to claim 20 further comprising means for selectively connecting said indicating device to said common points through a signal identifying device comprising a band pass filter with minimum attenuation for the tracing signal voltage, and an additional filter with its minimum attenuation to one side of and immediately adjacent to the passed band of the first-mentioned filter, rectifiers and equalizing devices connected to the output of said filters, and a polarized relay serving as said indicating device and operable in response to the difference between the rectified and equalized current from the said filters when said difference exceeds a predetermined value.

27. The arrangement according to claim 26, further comprising a third filter with a comparatively narrow frequency band of minimum attenuation on the side of the band passed by the said band pass filter other than the side passed by said second-mentioned filter, and means for adding the currents from the two filters having their bands on each side of the first-mentioned filter so that said polarized relay operates in response to the difference between the sum of the currents from the two side filters and the current from the first-mentioned filter.

28. In switching networks comprising a plurality of switching stages, each having a plurality of switches for selectively establishing signal connections through a series of such stages, an arrangement for the tracing of a connection set up by switches through a plurality of said switching stages from a known point of the connection in the forward direction of the switching course comprising: a source of alternating tracing voltage adapted to be connected to said known point; receiver means at a stage remote from said known point operating in response to said tracing voltage comprising a first band pass filter having a narrow frequency band tuned to receive said alternating tracing voltage; a second filter having its minimum attenuation tuned to a frequency at one side of and immediately adjacent to the pass band of said first filter, and an indicating device responsive to the difference between the currents passed by said two filters and operable when said current difference exceeds the predetermined value.

29. The switching network as defined in claim 28 further having a third filter having its pass band tuned to a frequency on the other side of the band passed by said first-mentioned filter, circuit means for combining the current from said second and third filters and means supplying said combined currents to said indicating device whereby said indicating device operates in response to the difference between the sum of the currents from the said second and third filters and the current from said first filter.

References Cited in the file of this patent

UNITED STATES PATENTS 2,686,840 Den Hertog ------------ Aug. 17, 1954

UNITED STATES PATENT OFFICE

CERTIFICATE OF CORRECTION

Patent No. 2,873,321 February 10, 1959

Dag V. L. Lindström et al.

It is hereby certified that error appears in the printed specification of the above numbered patent requiring correction and that the said Letters Patent should read as corrected below.

Column 1, line 49, for "intrerupted" read -- interrupted --; column 9, line 32, for "means" read -- meanings --; column 19, line 46, for "pulses" read -- impulses --; column 27, line 30, for "D53" read -- R53 --; line 32, for "D52" read -- R52 --.

Signed and sealed this 23rd day of June 1959.

(SEAL)

Attest:

KARL H. AXLINE

Attesting Officer

ROBERT C. WATSON

Commissioner of Patents